United States Patent
Imhof et al.

(10) Patent No.: US 10,422,900 B2
(45) Date of Patent: Sep. 24, 2019

(54) ANALYZING SEISMIC DATA

(71) Applicants: Matthias Imhof, Katy, TX (US); Pavel Dimitrov, Houston, TX (US); Laurie D. Gibson, Boulder, CO (US)

(72) Inventors: Matthias Imhof, Katy, TX (US); Pavel Dimitrov, Houston, TX (US); Laurie D. Gibson, Boulder, CO (US)

(73) Assignee: ExxonMobil Upstream Research Company, Spring, TX (US)

( * ) Notice: Subject to any disclaimer, the term of this patent is extended or adjusted under 35 U.S.C. 154(b) by 639 days.

(21) Appl. No.: 14/434,726

(22) PCT Filed: Aug. 30, 2013

(86) PCT No.: PCT/US2013/057634
§ 371 (c)(1),
(2) Date: Apr. 9, 2015

(87) PCT Pub. No.: WO2014/070296
PCT Pub. Date: May 8, 2014

(65) Prior Publication Data
US 2015/0293247 A1    Oct. 15, 2015

Related U.S. Application Data

(60) Provisional application No. 61/721,846, filed on Nov. 2, 2012.

(51) Int. Cl.
*G01V 1/30* (2006.01)

(52) U.S. Cl.
CPC .......... *G01V 1/301* (2013.01); *G01V 2210/64* (2013.01); *G01V 2210/642* (2013.01); *G01V 2210/74* (2013.01)

(58) Field of Classification Search
CPC ...... G01V 1/28–36; G01V 99/00; G01V 1/32; G01V 1/345
See application file for complete search history.

(56) References Cited

U.S. PATENT DOCUMENTS

| | | |
|---|---|---|
| 4,916,615 A | 4/1990 | Chittineni |
| 4,992,995 A | 2/1991 | Favret |

(Continued)

FOREIGN PATENT DOCUMENTS

| | | |
|---|---|---|
| WO | WO 99/64896 | 12/1999 |
| WO | WO 2005/017564 | 2/2005 |

(Continued)

OTHER PUBLICATIONS

Bell, S.B.M. et al. (1983), "Spatially referenced methods of processing raster and vector data," *Image and Vision Computing*, 1(4), pp. 211-220.

(Continued)

*Primary Examiner* — Eric A. Ward
*Assistant Examiner* — Eric K Ashbahian
(74) *Attorney, Agent, or Firm* — ExxonMobil Upstream Research Company-Law Department

(57) ABSTRACT

A system and methods for analyzing seismic data are provided herein. The method includes identifying, via a computing device, a representation of a seismic data set (1802) and determining a number of feature descriptors corresponding to each of a number of aggregates within the representation (1804). The method also includes identifying a query relating to the representation and one or more vocabulary definitions relating to the query (1806), analyzing the representation to compute a likelihood that each of the aggregates satisfies the query (1808), and returning a result of the query (1810).

25 Claims, 21 Drawing Sheets

(56) References Cited

U.S. PATENT DOCUMENTS

| | | |
|---|---|---|
| 5,047,991 A | 9/1991 | Hsu |
| 5,265,192 A | 11/1993 | McCormack |
| 5,274,714 A | 12/1993 | Hutcheson et al. |
| 5,349,527 A * | 9/1994 | Pieprzak ............... G01V 1/301 367/45 |
| 5,416,750 A | 5/1995 | Doyen et al. |
| 5,444,619 A | 8/1995 | Hoskins et al. |
| 5,465,308 A | 11/1995 | Hutcheson et al. |
| 5,539,704 A | 7/1996 | Doyen et al. |
| 5,586,082 A | 12/1996 | Anderson et al. |
| 5,677,893 A | 10/1997 | de Hoop et al. |
| 5,852,588 A | 12/1998 | de Hoop et al. |
| 5,940,777 A | 8/1999 | Keskes |
| 6,052,650 A | 4/2000 | Assa et al. |
| 6,128,577 A * | 10/2000 | Assa ...................... G01V 11/00 702/2 |
| 6,226,596 B1 | 5/2001 | Gao |
| 6,236,942 B1 | 5/2001 | Bush |
| 6,295,504 B1 | 9/2001 | Ye et al. |
| 6,363,327 B1 | 3/2002 | Wallet et al. |
| 6,411,903 B2 | 6/2002 | Bush |
| 6,466,923 B1 | 10/2002 | Young |
| 6,473,696 B1 | 10/2002 | Onyia et al. |
| 6,526,353 B2 | 2/2003 | Wallet et al. |
| 6,574,565 B1 | 6/2003 | Bush |
| 6,574,566 B2 | 6/2003 | Grismore et al. |
| 6,618,678 B1 | 9/2003 | Van Riel |
| 6,625,541 B1 | 9/2003 | Shenoy et al. |
| 6,725,163 B1 | 4/2004 | Trappe et al. |
| 6,735,526 B1 | 5/2004 | Meldahl et al. |
| 6,751,558 B2 | 6/2004 | Huffman et al. |
| 6,754,380 B1 | 6/2004 | Suzuki et al. |
| 6,754,589 B2 | 6/2004 | Bush |
| 6,757,614 B2 | 6/2004 | Pepper et al. |
| 6,771,800 B2 | 8/2004 | Keskes et al. |
| 6,801,858 B2 | 10/2004 | Nivlet et al. |
| 6,804,609 B1 | 10/2004 | Brumbaugh |
| 6,847,895 B2 | 1/2005 | Nivlet et al. |
| 6,882,997 B1 | 4/2005 | Zhang et al. |
| 6,941,228 B2 | 9/2005 | Toelle |
| 6,950,786 B1 | 9/2005 | Sonneland et al. |
| 6,957,146 B1 | 10/2005 | Taner et al. |
| 6,970,397 B2 | 11/2005 | Castagna et al. |
| 6,977,866 B2 | 12/2005 | Huffman et al. |
| 6,988,038 B2 | 1/2006 | Trappe et al. |
| 7,006,085 B1 | 2/2006 | Acosta et al. |
| 7,053,131 B2 | 5/2006 | Ko et al. |
| 7,092,824 B2 | 8/2006 | Favret et al. |
| 7,098,908 B2 | 8/2006 | Acosta et al. |
| 7,162,463 B1 | 1/2007 | Wentland et al. |
| 7,184,991 B1 | 2/2007 | Wentland et al. |
| 7,188,092 B2 | 3/2007 | Wentland et al. |
| 7,203,342 B2 | 4/2007 | Pederson |
| 7,206,782 B1 | 4/2007 | Padgett |
| 7,222,023 B2 | 5/2007 | Laurenet et al. |
| 7,243,029 B2 | 7/2007 | Lichman et al. |
| 7,248,258 B2 | 7/2007 | Acosta et al. |
| 7,248,539 B2 | 7/2007 | Borgos et al. |
| 7,266,041 B1 | 9/2007 | Padgett |
| 7,295,730 B2 | 11/2007 | Wentland et al. |
| 7,295,930 B2 | 11/2007 | Dulac et al. |
| 7,308,139 B2 | 12/2007 | Wentland et al. |
| 7,453,766 B1 | 11/2008 | Padgett |
| 7,453,767 B1 | 11/2008 | Padgett |
| 7,463,552 B1 | 12/2008 | Padgett |
| 7,502,026 B2 | 3/2009 | Acosta et al. |
| 7,658,202 B2 | 2/2010 | Wiley et al. |
| 7,697,373 B1 | 4/2010 | Padgett |
| 7,876,967 B2 | 1/2011 | Shar |
| 7,881,501 B2 | 2/2011 | Pinnegar et al. |
| 7,895,241 B2 | 2/2011 | Schoen et al. |
| 8,010,294 B2 | 8/2011 | Dorn et al. |
| 8,018,458 B2 | 9/2011 | Peterson |
| 8,027,517 B2 | 9/2011 | Gauthier et al. |
| 8,055,026 B2 | 11/2011 | Pedersen |
| 8,065,088 B2 | 11/2011 | Dorn et al. |
| 8,121,969 B2 | 2/2012 | Chan et al. |
| 8,128,030 B2 | 3/2012 | Dannenberg |
| 8,219,322 B2 | 7/2012 | Monsen et al. |
| 8,326,542 B2 | 12/2012 | Chevion et al. |
| 8,346,695 B2 | 1/2013 | Peper et al. |
| 8,358,561 B2 | 1/2013 | Kelly et al. |
| 8,363,959 B2 | 1/2013 | Boiman et al. |
| 8,380,435 B2 | 2/2013 | Kumaran et al. |
| 8,385,603 B2 | 2/2013 | Beucher et al. |
| 8,447,525 B2 | 5/2013 | Pepper et al. |
| 8,463,551 B2 | 6/2013 | Aarre |
| 8,515,678 B2 | 8/2013 | Pepper et al. |
| 2004/0158406 A1* | 8/2004 | Harrison ................. E21B 49/00 702/13 |
| 2005/0137274 A1 | 6/2005 | Ko et al. |
| 2005/0171700 A1 | 8/2005 | Dean |
| 2005/0288863 A1 | 12/2005 | Workman |
| 2006/0115145 A1 | 6/2006 | Bishop |
| 2006/0184488 A1 | 8/2006 | Wentland |
| 2006/0265197 A1* | 11/2006 | Peterson ........... G06F 17/30241 703/2 |
| 2007/0067040 A1 | 3/2007 | Ferree |
| 2008/0123469 A1 | 5/2008 | Wibaux et al. |
| 2008/0270033 A1 | 10/2008 | Wiley et al. |
| 2010/0174489 A1 | 7/2010 | Bryant et al. |
| 2010/0204972 A1* | 8/2010 | Hsu ...................... E21B 49/006 703/10 |
| 2010/0211363 A1 | 8/2010 | Dorn et al. |
| 2010/0245347 A1 | 9/2010 | Dorn et al. |
| 2011/0208724 A1 | 8/2011 | Jones et al. |
| 2011/0218737 A1* | 9/2011 | Gulati ..................... G01V 1/28 702/16 |
| 2011/0295510 A1* | 12/2011 | Gulati ..................... G01V 1/28 702/16 |
| 2011/0307178 A1 | 12/2011 | Hoekstra |
| 2012/0072116 A1 | 3/2012 | Dorn et al. |
| 2012/0090001 A1 | 4/2012 | Yen |
| 2012/0117124 A1 | 5/2012 | Bruaset et al. |
| 2012/0150447 A1 | 6/2012 | Van Hoek et al. |
| 2012/0183190 A1* | 7/2012 | Fukutani ............... A61B 5/0073 382/128 |
| 2012/0195165 A1 | 8/2012 | Vu et al. |
| 2012/0197530 A1 | 8/2012 | Posamentier et al. |
| 2012/0197531 A1 | 8/2012 | Posamentier et al. |
| 2012/0197532 A1 | 8/2012 | Posamentier et al. |
| 2012/0197613 A1 | 8/2012 | Vu et al. |
| 2012/0209526 A1 | 8/2012 | Imhof |
| 2012/0257796 A1 | 10/2012 | Henderson et al. |
| 2012/0322037 A1 | 12/2012 | Raglin |
| 2013/0006591 A1 | 1/2013 | Pyrcz et al. |
| 2013/0138350 A1 | 5/2013 | Thachaparambil et al. |
| 2013/0158877 A1* | 6/2013 | Bakke .................... G01V 11/00 702/14 |

FOREIGN PATENT DOCUMENTS

| | | | |
|---|---|---|---|
| WO | WO 2007/004868 | 1/2007 | |
| WO | WO 2011/149609 | * 12/2011 | ............... G01V 1/40 |

OTHER PUBLICATIONS

Chen, H.. et al. ( ), "Septree representation of moving objects using hexagonal cylindrical decomposition," *Optical Engineering* 23(5), pp. 531-535.

Gibson, L et al. (1982), "Spatial Data Processing Using Generalized Balanced Ternary," IEE Conf. on Pattern Reocognition and Image Analysis, pp. 566-571.

Lucas, D. (1979), "A multiplication in N-space, " Proceedings of the American Mathematical Society 74(1), pp. 1-8.

Middleton, L. et al. (2001), "Edge detection in a hexagonal-image processing framework, " *Image and Vision Computing* 19, pp. 1071-1081.

Shar, K. (2008), "Location coding on isosahedral aperture 3 hexagon discrete global grids, " *Computers, Environment and Urban Systems* 32, pp. 174-187.

(56) References Cited

OTHER PUBLICATIONS

Snyder, W.E. (1999), "A coordinate system for hexagonal pixels," SPIE Conf. on Image Processing 3661, pp. 716-727.
Zapata, J.L. et al. (2000) "Fast Fourier Transform for Hexagonal Aggregates," *Journal of Mathematical Imaging and Vision* 12, pp. 183-187.
Hashemi et al. (2008) "Gas chimney detection based on improving the performance of combined multilayer perceptron and support vector classifier", Nonlinear Processes in Geophysics, 15, pp. 863-871.

* cited by examiner

100

300

310

400

500

600

700

800

900

1000

1200

1300

1302

1400

ANALYZING SEISMIC DATA

CROSS-REFERENCE TO RELATED APPLICATION

This application is the National Stage of International Application No. PCT/US2013/057634, that published as WO 2014/070296, filed 30 Aug. 2013, which claims the benefit of U.S. Provisional Patent Application 61/721,846, filed 2 Nov. 2012, entitled ANALYZING SEISMIC DATA, the entirety of which is incorporated by reference herein, for all purposes.

FIELD

The present techniques are directed a system and methods for analyzing seismic data. More specifically, the present techniques are directed to a system and methods for determining the likelihood that each of a number of aggregates within a representation of a seismic data set satisfies a query relating to the seismic data set based on feature descriptors corresponding to the aggregates.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

To search for hydrocarbon accumulations in the earth, geoscientists often use methods of remote sensing to look below the earth's surface. In the routinely used seismic reflection method, man-made sound waves are generated near the surface. The sound propagates into the earth, and as the sound passes from one rock layer into another, a small portion of the sound reflects back to the surface, where it is recorded as seismic data. Typically, hundreds to thousands of recording instruments are employed. Sound waves are sequentially excited at many different surface locations, and the recording instruments record the sound waves as seismic data. A two-dimensional or three-dimensional image of the subsurface is obtained from data processing of the recorded seismic data. However, such two-dimensional or three-dimensional images may occupy a large amount of storage space, for example, ranging from hundreds of megabytes to many gigabytes of storage space.

In current practice, an interpreter is initially tasked with scoping the data to identify regions in the subsurface with the potential of containing hydrocarbon accumulations. These regions are then carefully examined to develop a list of prospects, or areas in which hydrocarbons are predicted to exist in economic quantities. As used herein, the term "prospect" refers to a geologic or geophysical anomalous feature that is recommended for drilling a well based on direct hydrocarbon indications or a reasonable probability of encountering reservoir-quality rocks, a trap of sufficient size, adequate sealing rocks, or appropriate conditions for generation and migration of hydrocarbons to fill the trap. Current techniques for seismic data analysis, however, are often tedious, labor-intensive, and time-consuming.

Seismic interpretation generally involves a person skilled in geologic interpretation, referred to as an interpreter, who reviews seismic reflections and maps the seismic reflections into seismic horizons. A seismic horizon may include boundaries in the subsurface structures that are useful to an interpreter, which is a subjective process. Further, manually identifying seismic horizons using an interpreter may be a time consuming process.

Geological and geophysical features exist at many different scales. Subsurface channels may exhibit widths ranging from tens of meters (m) to tens of kilometers (km). Seismic images of the subsurface are formed by sampling, and, thus, the spatial and temporal sampling intervals used for data acquisition and processing affect the scale of features in terms of the number of samples. In addition, interpreters often reduce the amount of seismic data that is stored to decrease storage costs or to increase computational efficiency. For example, interpreters may remove every other sample within the seismic data prior to storage. On the other hand, additional samples within the seismic data may be interpolated for computation or visualization purposes, resulting in an increase in storage costs and a decrease in computational efficiency.

Tool sets for computer-aided volume interpretation typically include horizon tracking techniques that are used to find seismic horizons. Horizon tracking may follow the peaks of seismic amplitudes starting with a user provided seed point in a vertical seismic section. The vertical seismic section can be either a cross-line vertical section in the y-z plane or an in-line vertical section in the x-z plane.

Another horizon tracking technique is known as "seed detection," which is a technique for growing a region in a three dimensional seismic data volume. Seed detection may result in a set of connected voxels in a 3D seismic data volume which fulfill user-specified attribute criteria. Seed detection may begin with a point in a data volume to connect with admissible neighbors to fully define a connected object. Admissible neighbors are those surrounding points that meet user defined criteria. The new points are added to the current object and the procedure continues until it reaches a point where no further admissible neighbors exist.

An example of a horizon tracking technique is discussed in United States Patent Application Publication No. 2008/0285384 by James. The application describes a seed picking algorithm that can use a first point for picking a set of second points from a data set. Each of the points in the set of second points can be set as the first point, and the algorithm may repeat. An iteration number or other attribute can be assigned to the points, and the iteration number can correspond to the number of times the algorithm has been repeated to process the point. The attribute or a number of attributes can be displayed as a visual characteristic for each point. An iterative process can be applied to a set of seismic data points, starting at a seed data point and finding a set of next iteration seed points from the set of points neighboring the seed point, continuing only with next iteration seed points. The number of points that are found by the process when the point is used as a seed data point can be recorded for each of a set of data points.

In another example, International Patent Application Publication No. 2010/047856 by Mark Dobin, et al., describes a method and system that may identify a geologic object through cross sections of a geologic data volume. The method includes obtaining a geologic data volume having a set of cross sections. Then, two or more cross sections can be selected, and a transformation vector can be estimated between the cross sections. Based on the transformation vector, a geologic object can be identified within the geologic data volume.

In still another example, United States Patent Application Publication No. 2008/0071477 by Li, et al., describes a method that may determine a fault surface in a formation by determining a first plurality of cross correlation values for a 3D Volume associated, respectively, with a corresponding first number of 3D Volumes. A first minimum one of a first number of cross correlation values can be selected. Additionally, a first derived fault segment corresponding to the first minimum of the first number of cross correlation values can be selected, including the first derived fault segment approximately lying on the fault surface and tending to determine the fault surface in the formation.

The existing techniques described above tend to find geologic objects, including horizons, using input from an interpreter. However, such techniques may be labor intensive and time consuming due to the dependency on such input from the interpreter. Therefore, such techniques may not be cost-effective for very large seismic data sets.

SUMMARY

An exemplary embodiment provides a method for analyzing seismic data. The method includes identifying, via a computing device, a representation of a seismic data set and determining a number of feature descriptors corresponding to each of a number of aggregates within the representation. The method also includes identifying a query relating to the representation and one or more vocabulary definitions relating to the query, analyzing the representation to compute a likelihood that each of the aggregates satisfies the query, and returning a result of the query.

Another exemplary embodiment provides a system for analyzing seismic data. The system includes a processor a storage medium. The storage medium includes a representation of a seismic data set, wherein the representation includes a representation including a number of aggregates, and a number of feature descriptors corresponding to each of the aggregates within the representation. The system also includes a non-transitory machine readable medium including code configured to direct the processor to identify a query relating to the representation and one or more vocabulary definitions relating to the query and analyze the representation to compute a likelihood that each of the aggregates satisfies the query.

Another exemplary embodiment provides method for identifying or characterizing prospects within a subsurface represented by a seismic data set. The method includes identifying, via a computing device, a recursive geometric representation of a seismic data set including a number of aggregates and determining a number of feature descriptors corresponding to each of the aggregates within the recursive geometric representation. The method also includes identifying a query relating to an identification or a characterization, or both, of the prospects within the subsurface and identifying one or more vocabulary definitions relating to the query. The method further includes analyzing the recursive geometric representation based on the query to identify the prospects or characterize the prospects, or any combination thereof.

DESCRIPTION OF THE DRAWINGS

The advantages of the present techniques are better understood by referring to the following detailed description and the attached drawings, in which.

DETAILED DESCRIPTION

Figure 1:
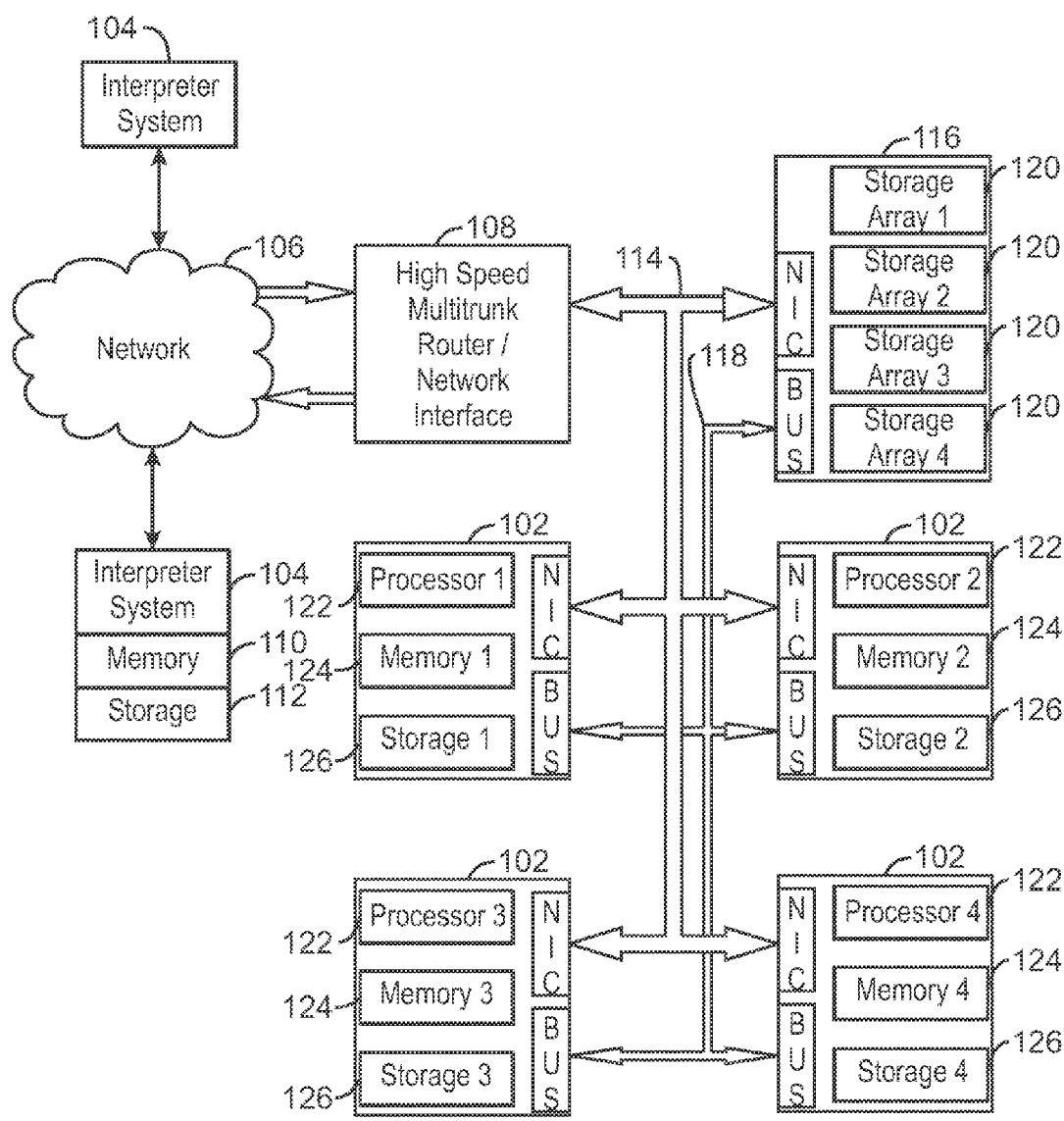
FIG. 1 is a block diagram of a cluster computing system that may be used to implement the techniques described herein for analyzing seismic data.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, the term "discontinuity" refers to a sudden change in seismic data, and may be indicative of faults, salt domes, or other interesting interruptions in formation geometry. Discontinuity and continuity may be considered opposite ends of a continuity spectrum, so that a high continuity measurement is indicative of a low discontinuity, and conversely, a high discontinuity measurement is indicative of a low continuity.

The term "gas" is used interchangeably with "vapor," and means a substance or mixture of substances in the gaseous state as distinguished from the liquid or solid state. Likewise, the term "liquid" means a substance or mixture of substances in the liquid state as distinguished from the gas or solid state. As used herein, "fluid" is a generic term that can encompass either liquids or gases.

The term "gradient" refers to the rate of change of any property, such as pressure, in a given direction.

A "hydrocarbon" is an organic compound that primarily includes the elements hydrogen and carbon, although nitrogen, sulfur, oxygen, metals, or any number of other elements may also be present in small amounts. As used herein, hydrocarbons generally refer to organic materials (e.g., natural gas) that are harvested from hydrocarbon containing subsurface rock layers, termed reservoirs.

The term "interpreter" refers to a person skilled in geologic interpretation. An interpreter is involved in the development of an exploration prospect.

The term "kriging" refers to a group of geostatistical techniques to interpolate the value of a random field at an unobserved location from observations of its value at nearby locations. From the geologic point of view, the practice of kriging is based on assuming continuity between measured values. Given an ordered set of measured grades, interpolation by kriging predicts concentrations at unobserved points.

The term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($C_1$) as a significant component. Raw natural gas also typically contains higher carbon number compounds, such as ethane ($C_2$), propane, and the like, as well as acid gases (such as carbon dioxide, hydrogen sulfide, carbonyl sulfide, carbon disulfide, and mercaptans), and minor amounts of contaminants such as water, nitrogen, iron sulfide, wax, and crude oil.

"Pressure" is the force exerted per unit area by the gas on the walls of the volume. Pressure can be shown as pounds per square inch (psi). "Atmospheric pressure" refers to the local pressure of the air. "Absolute pressure" (psia) refers to the sum of the atmospheric pressure (14.7 psia at standard conditions) plus the gauge pressure (psig). "Gauge pressure" (psig) refers to the pressure measured by a gauge, which indicates only the pressure exceeding the local atmospheric pressure, i.e., a gauge pressure of 0 psig corresponds to an absolute pressure of 14.7 psia. The term "vapor pressure" has the usual thermodynamic meaning. For a pure component in an enclosed system at a given pressure, the component vapor pressure is essentially equal to the total pressure in the system.

As used herein, a "reservoir" is a subsurface rock formation, often porous sand, from which a production fluid, or resource, can be harvested. The rock formation may include sand, granite, silica, carbonates, clays, and organic matter, such as bitumen, heavy oil, oil, gas, or coal, among others. Reservoirs can vary in thickness from less than one foot (0.3048 m) to hundreds of feet (hundreds of m). The resource is generally a hydrocarbon, such as a heavy oil impregnated into a sand bed.

As used herein, "seismic attributes" are measurements based on seismic data. Non-limiting examples of seismic attributes include local amplitude, phase, frequency, dip, discontinuity, velocity, or impedance. Such seismic attributes may be used to facilitate manual or automatic recognition of desired geologic features in seismic data. Seismic attributes can be obtained by any one of a variety of well-known transformations applied to seismic data, or simply by measurements made on the seismic traces. In addition, seismic attributes are quantitatively descriptive of some aspect of the wavelike nature of the seismic signals relating to the seismic data.

The term "seismic data" refers to a multi-dimensional matrix or grid containing information about points in the subsurface structure of a field, where the information was obtained using seismic methods. Seismic data typically is represented using a structured grid. Seismic attributes or properties can be represented in individual cells or volume pixels (voxels). Seismic data may be volume rendered with opacity or texture mapped on a surface.

As used herein, "seismic prospecting techniques" are techniques commonly used to aid in the search for and evaluation of subterranean hydrocarbon deposits. Seismic prospecting techniques typically involve three separate stages, namely, data acquisition, data processing, and data interpretation. The subterranean hydrocarbon deposits that are identified using the seismic processing techniques may be referred to as "prospects."

The term "seismic volume" refers to particular seismic data defined at locations in a three-dimensional representation of seismic data. Thus, data may be represented as a multi-dimensional matrix of values, wherein three coordinates are used to represent the three-dimensional location of a particular data volume in space, such as x, y, and z, and numerous additional terms may be used to represent specific physical attributes associated with the volume, such as amplitude, velocity, density, seismic attributes, and the like.

The term "seismic wave" refers to any mechanical wave that propagates in the subsurface of the earth or sea and includes, but is not limited to, P-waves and S-waves.

A practitioner of the art will recognize that seismic data can be augmented with or substituted by other types of data used to characterize the subsurface. Such geophysical, geological, or engineering data include but are not limited to resistivity, density, geological models, or the results of reservoir simulations.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

The term "voxel," or volume pixel, refers to the smallest data point in a three-dimensional volumetric object. Each voxel has a unique set of coordinates and contains one or more data values that represent the properties at each set of coordinates. Each voxel represents a discrete sampling of a three-dimensional space, similar to the manner in which pixels represent sampling of the two-dimensional space. The location of a voxel can be calculated using the grid origin, the unit vectors, and the indices of the voxel. Each voxel can be expressed in the form (x, y, z, data value) where "x, y, z" identifies the 3D location of the point within the volume.

Techniques described herein provide a system and methods for the representation of a seismic data volume in a hierarchical, multi-scalar manner, as well as the summarization of the seismic data within multi-scalar regions of the representation using feature descriptors. An interpreter may specify geophysical and/or geological targets to be identified within the representation of the seismic data volume. This may be accomplished by defining a flexible, problem-specific vocabulary and the probabilistic relationships between the vocabulary and the feature descriptors. The defined vocabulary and the probabilistic relationships may then be applied to the seismic data to identify the geophysical and/or geological targets. For example, a probability that a geophysical or geological target exists at a given scale and location may be determined.

As discussed above, geological and geophysical features exist at many different scales. Thus, given the overall variability in feature size within seismic data, it may desirable to formulate queries relating to such seismic data that are independent of scale. Accordingly, embodiments described herein provide a system and methods for representing a seismic data volume in a hierarchically scale-decomposed manner and allowing for the formulation of queries independently of the absolute scale of the seismic data volume. Due to this scale independency, queries for the detection of mathematical relationships that indicate the presence of channels, salt bodies, faults, or geophysical anomalies, for example, can be transferred between different regions of one seismic data set, between entirely different data sets, or between different geographic regions. In various embodiments, the queries are formulated in plain language using words whose translation to quantitative feature descriptors is adjustable by the interpreter or the system to allow for variations in personal preferences or numerical data ranges. Such queries may allow for the identification or characterization of subsurface features in a repeatable, efficient, and interactive manner. The present techniques may be further understood in view of FIGS. 1-18.

FIG. 1 is a block diagram of a cluster computing system 100 that may be used to implement the techniques described herein for analyzing seismic data. The cluster computing system 100 illustrated has four computing units 102, each of which may perform calculations for analyzing seismic data. However, one of ordinary skill in the art will recognize that the present techniques are not limited to this configuration, as any number of computing configurations may be selected. For example, a smaller model may be run on a single computing unit 102, such as a workstation, while a large model may be run on a cluster computing system 100 having 10, 100, 1000, or even more computing units 102.

The cluster computing system 100 may be accessed from one or more interpreter systems 104 over a network 106, for example, through a high speed network interface 108. The network 106 may include a local area network (LAN), a wide area network (WAN), the Internet, or any combinations thereof. Each of the interpreter systems 104 may have non-transitory, computer-readable memory 110 for the storage of operating code and programs, including random access memory (RAM) and read only memory (ROM). The operating code and programs may include the code used to implement all or any portions of the methods discussed herein, for example, as discussed with respect to FIGS. 2A, 2B, and 18. Further, the non-transitory computer-readable media may hold full state checkpoints, correlation checkpoints, and simulation results, such as a data representation of a subsurface space. The interpreter systems 104 can also have other non-transitory, computer-readable media, such as storage systems 112. The storage systems 112 may include one or more hard drives, one or more optical drives, one or more flash drives, any combinations of these units, or any other suitable storage device. The storage systems 112 may be used for the storage of checkpoints, code, models, data, and other information used for implementing the methods described herein.

The high-speed network interface 108 may be coupled to one or more communications busses in the cluster computing system 100, such as a communications bus 114. The communication bus 114 may be used to communicate instructions and data from the high-speed network interface 108 to a cluster storage system 116 and to each of the computing units 102 in the cluster computing system 100. The communications bus 114 may also be used for communications among computing units 102 and the storage array 116. In addition to the communications bus 114, a high-speed bus 118 can be present to increase the communications rate between the computing units 102 and/or the cluster storage system 116.

Figure 2A:
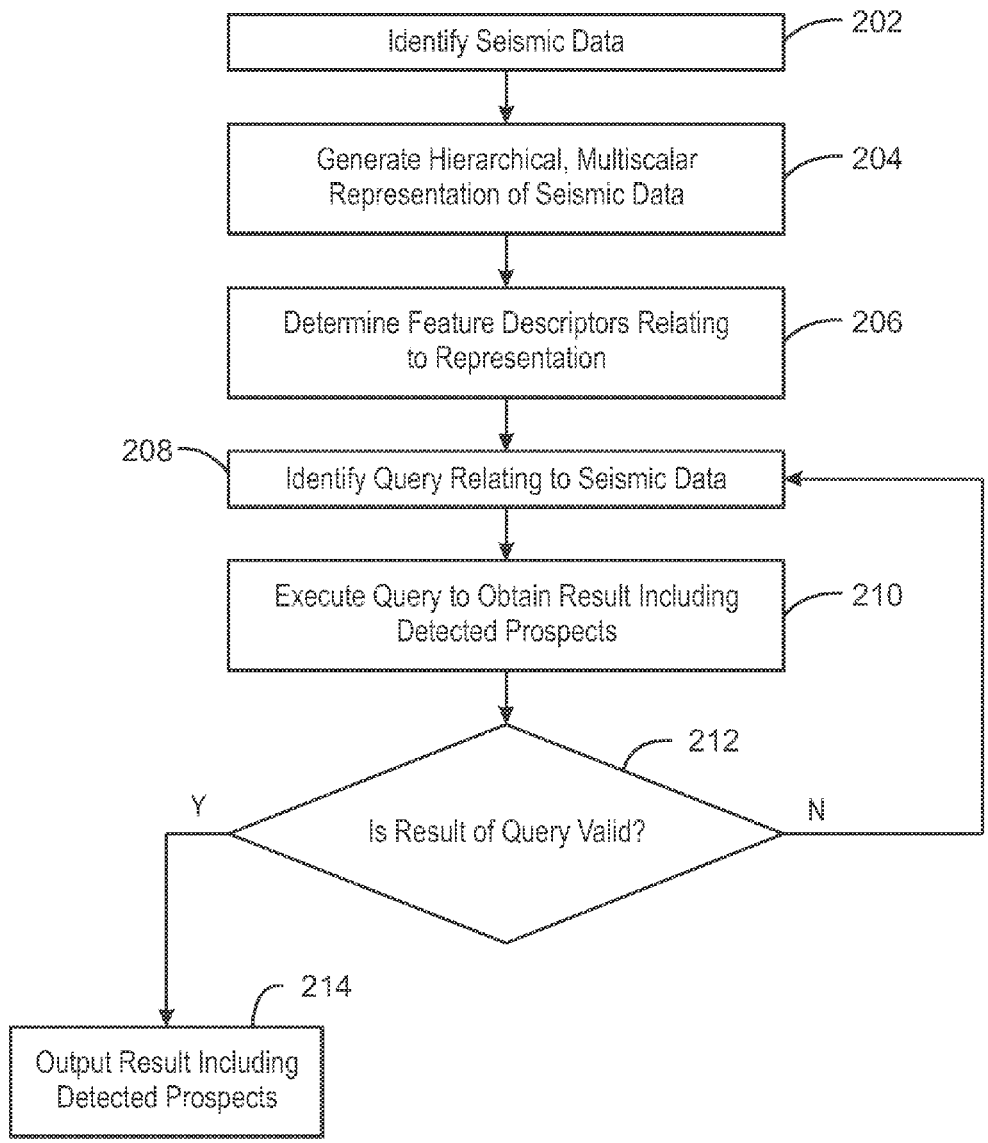
FIG. 2A is a process flow diagram of a method for analyzing seismic data according to a query.
Figure 2B:
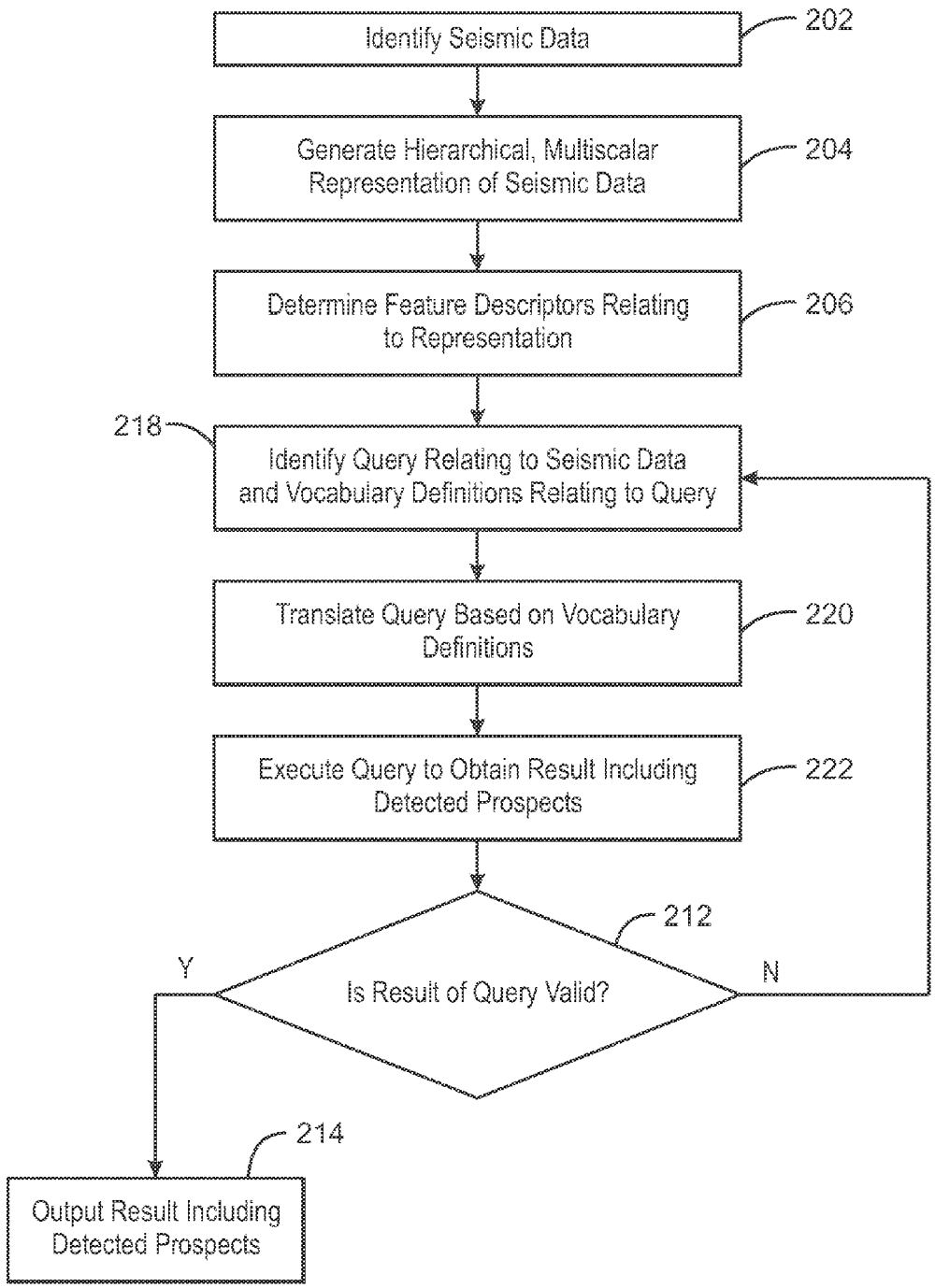
FIG. 2B is a process flow diagram of a method for analyzing seismic data according to a query formulated in plain language using one or more vocabulary definitions.
Figure 18:
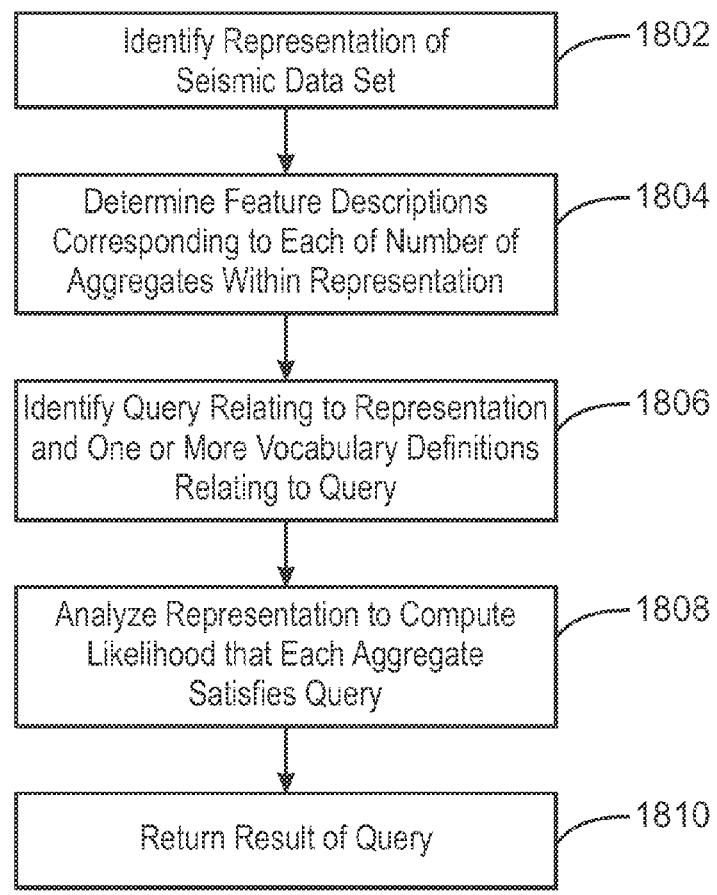
FIG. 18 is a simplified process flow diagram of a method for analyzing seismic data.

The cluster storage system 116 can have one or more non-transitory, computer-readable media devices, such as storage arrays 120 for the storage of checkpoints, data, visual representations, results, code, or other information, for example, concerning the implementation of and results from the methods of FIGS. 2A, 2B, and 18. The storage arrays 120 may include any combinations of hard drives, optical drives, flash drives, holographic storage arrays, or any other suitable devices.

Each of the computing units 102 can have a processor 122 and an associated local tangible, computer-readable media, such as memory 124 and storage 126. Each of the processors 122 may be a multiple core unit, such as a multiple core CPU or a GPU. The memory 124 may include ROM and/or RAM used to store code, for example, used to direct the processor 122 to implement the methods described below with respect to FIGS. 2A, 2B, and 18. The storage 126 may include one or more hard drives, one or more optical drives, one or more flash drives, or any combinations thereof. The storage 126 may be used to provide storage for checkpoints, intermediate results, data, images, or code associated with operations, including code used to implement the methods described below with respect to FIGS. 2A, 2B, and 18.

The present techniques are not limited to the architecture or unit configuration illustrated in FIG. 1. For example, any suitable processor-based device may be utilized for implementing all or a portion of embodiments of the present techniques, including without limitation personal computers, networks personal computers, laptop computers, computer workstations, GPUs, mobile devices, and multi-processor servers or workstations with (or without) shared memory. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments described herein.

FIG. 2A is a process flow diagram of a method 200 for analyzing seismic data according to a query. The method begins at block 202 with the identification, or selection, of at least one seismic data set. The seismic data may be collected using seismic imaging techniques, and may represent a particular region of a subsurface. In some embodiments, this data set is first transformed to a secondary or derived data set, often called a seismic attribute. In some embodiments, this seismic data set is substituted with other geophysical, geological, or engineering data sets, or augmented with other geophysical, geological, or engineering data sets. Geophysical, geological, or engineering data sets include, but are not limited to, velocity, impedance, porosity, permeability, oil saturation, and pressure.

At block 204, a hierarchical, multi-scalar representation of the seismic data is generated. The representation may include a number of aggregates, and may be generated by reformatting the seismic data. Each aggregate may include one or more individual cells, and each cell may include one or more voxels representing specific seismic data. In addition, the representation may be divided into a number of different levels, wherein each level includes aggregates of a specific size. For example, if the representation is a recursive hexagonal representation, the lowest level of the representation may include aggregates of a single cell, the next lowest level of the representation may include aggregates of seven cells, and the next lowest level of the representation may include aggregates of forty-nine cells, and so on.

The level or size of an aggregate may relate to its position in the representation and, thus, its resolution. First level aggregates may include elementary cells or aggregates within the representation of the seismic data. Second level aggregates may include groups of elementary cells of the first level. For an aggregate of a given level, all lower level aggregates contained within said aggregate may be referred to as the children or subordinates of the aggregate. For example, for a third level aggregate, the second level aggregates within the third level aggregate may be referred to as the direct children, or direct subordinates, of the third level aggregate. Similarly, all higher level aggregates that contain said third level aggregate may be referred to as the parents of the third level aggregate. The fourth level aggregate that contains the third level aggregate may be referred to as the direct parent of the third level aggregate.

At block 206, feature descriptors relating to the representation are determined. The feature descriptors may be computed for each cell of the representation, and may be stored within the representation. The feature descriptors may be specific attributes of the seismic data, such as numerical values or numerical ranges that are indicative of particular geological or geophysical features of the subsurface represented by the seismic data.

At block 208, a query relating the seismic data is identified. The query may be formulated by an interpreter via a user interface, for example. The query may include a request for the identification or characterization of potential targets, or prospects.

At block 210, the query is executed to obtain a result including any detected prospects. In some embodiments, the query is performed on a computer system, preferably a cluster computing system. At block 212, it is determined whether the result of the query is valid. This may be accomplished, for example, by allowing the interpreter to analyze the result of the query. If it is determined that the result of the query is valid, the result of the query, including any detected prospects, is output at block 214.

If it is determined that the result of the query is not valid, the method 200 returns to block 208. At block 208, a new query relating to the seismic data is identified. The new query may be an updated version of the original query that has been refined by the interpreter based on the analysis of the result of the original query. In this manner, the query may be continuously refined until a valid result is obtained.

The process flow diagram of FIG. 2A is not intended to indicate that the blocks of the method 200 are to be executed in any particular order, or that all of the blocks are to be included in every case. Further, any number of additional blocks not shown in FIG. 2A may be included within the method 200, depending on the details of the specific implementation. For example, in some embodiments, the query is formulated in plain language, and a number of vocabulary definitions relating to the query are defined, as described further below with respect to FIG. 2B.

FIG. 2B is a process flow diagram of a method 216 for analyzing seismic data according to a query formulated in plain language using one or more vocabulary definitions. The first three blocks of the method 216, i.e., blocks 202, 204, and 206, are performed in a similar manner as described with respect to the method 200 of FIG. 2A.

At block 218, a query relating to the seismic data and one or more vocabulary definitions are identified. The query may be formulated by the interpreter in plain language. Formulating the query in plain language may allow the query to be reusable, repeatable, and reproducible. For example, the query may state "Find salt bodies defined as extended regions on discontinuity data that are bright and exhibit high variability." This query specifies how the interpreter expects a salt body to be represented by the discontinuity data. One or more vocabulary definitions may also be provided to clarify the meaning of each term in the query. For example, the term "bright" may be defined as having a "high mean" within a region, wherein the term "high mean" has also been defined, for example, according to a lower threshold value. In addition, the terms "high variability" and "extended region" may be defined as well. Thus, the interpreter may create a vocabulary, and the vocabulary may be parameterized to relate its entries to the feature descriptors for the entered seismic data. Moreover, the interpreter may provide one or more rules regarding the interaction of feature descriptors within individual aggregates of the representation and between nearby aggregates of the representation. Queries and associated vocabulary may be stored for future use, or may serve as building blocks for more complex queries. For example, the query "Find amplitude anomalies near salt" may reuse the term "salt" from a previous query, and may define "anomalous amplitude" based on the definition for "high mean."

The query is translated into a probabilistic framework based on the vocabulary definitions at block 220, and the query is executed to obtain a result including detected prospects at block 222. In various embodiments, the result is the likelihood that each aggregate within the representation satisfies the query. This likelihood may be a probability or a confidence factor within a specific range.

The query may be performed in a probabilistic manner to yield gradational results. A word in the dictionary such as "high mean" can then be represented as a map that relates a mean feature descriptor to a probability of high mean. Such a probabilistic query can, for example, be based on Bayesian theory that allows breaking the query into smaller parts and accumulating the smaller parts to obtain the final result. Therefore, execution of the query may include translating the plain language query using the vocabulary definitions and associated maps to a probabilistic query. In some embodiments, using a map to relate a dictionary word for a feature descriptor to a probability function allows for the adjustment of the map during an iterative refinement step without changing the query itself.

The last two blocks of the method 216, i.e., blocks 212 and 214, are performed as described with respect to the method 200 of FIG. 2A. Therefore, the interpreter may analyze the result of the query to determine whether it is valid. In addition, the interpreter may refine the query, the vocabulary definitions, or the relationships between the vocabulary definitions or the feature descriptors, or any combinations thereof, such that a valid result is obtained.

The process flow diagram of FIG. 2B is not intended to indicate that the blocks of the method 216 are to be executed in any particular order, or that all of the blocks are to be included in every case. Further, any number of additional blocks not shown in FIG. 2B may be included within the method 216, depending on the details of the specific implementation.

Figure 3A:
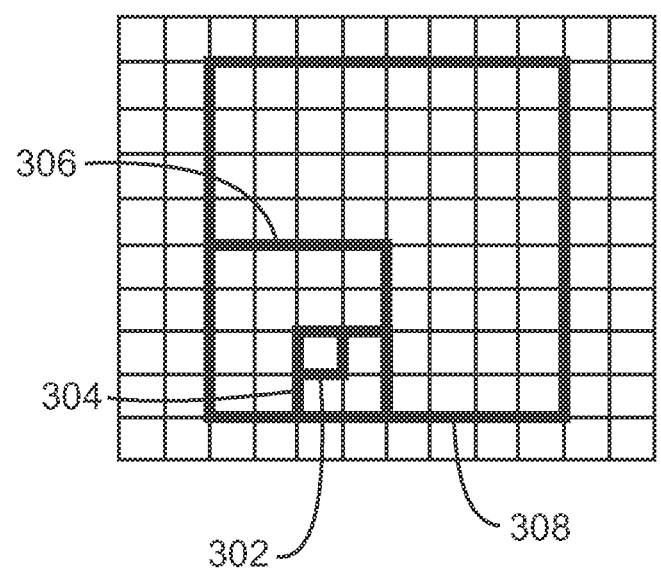
FIG. 3A is a schematic of a hierarchical representation of two-dimensional seismic data.

FIG. 3A is a schematic of a hierarchical representation 300 of two-dimensional seismic data. The hierarchical representation 300 may be generated via recursive quadrangular decomposition of the seismic data into a number of different levels of quadrangles. Each level may be associated with one or more aggregates including quadrangular groups referred to as quadtrees. A first level 302 includes a single quadrangle. A second level 304 includes four quadrangles, e.g., a group of four individual quadrangles of the first level 302. A third level 306 includes sixteen quadrangles, e.g., four groups of four quadrangles of the second level 304. A fourth level 308 includes sixty-four quadrangles, e.g., four groups of sixteen quadrangles of the third level 306. In various embodiments, the hierarchical representation 300 is built in this manner for any number of levels, depending on the size and the amount of seismic data that is to be represented. At each level, the individual quadrangles are treated as a single entity.

Figure 3B:
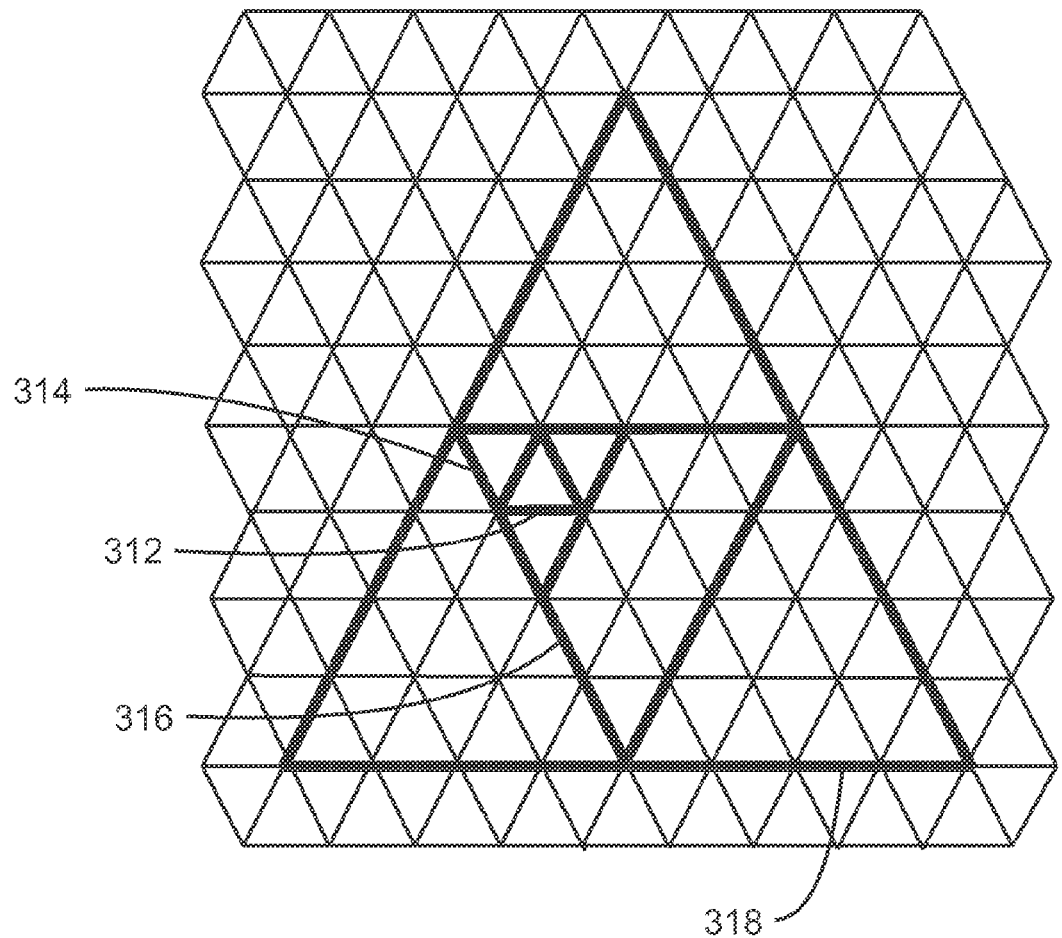
FIG. 3B is schematic of another hierarchical representation of two-dimensional seismic data.

FIG. 3B is schematic of another hierarchical representation 310 of two-dimensional seismic data. The hierarchical representation 310 may be generated via recursive triangular decomposition of the seismic data into a number of different levels of triangles. A first level 312 includes a single triangle. A second level 314 includes four triangles, e.g., a group of four individual triangles of the first level 312. A third level 316 includes sixteen triangles, e.g., four groups of four triangles of the second level 314. A fourth level 318 includes sixty-four triangles, e.g., four groups of sixteen triangles of the third level 316. In various embodiments, the hierarchical representation 310 is built in this manner for any number of levels, depending on the size and the amount of seismic data that is to be represented.

Figure 4:
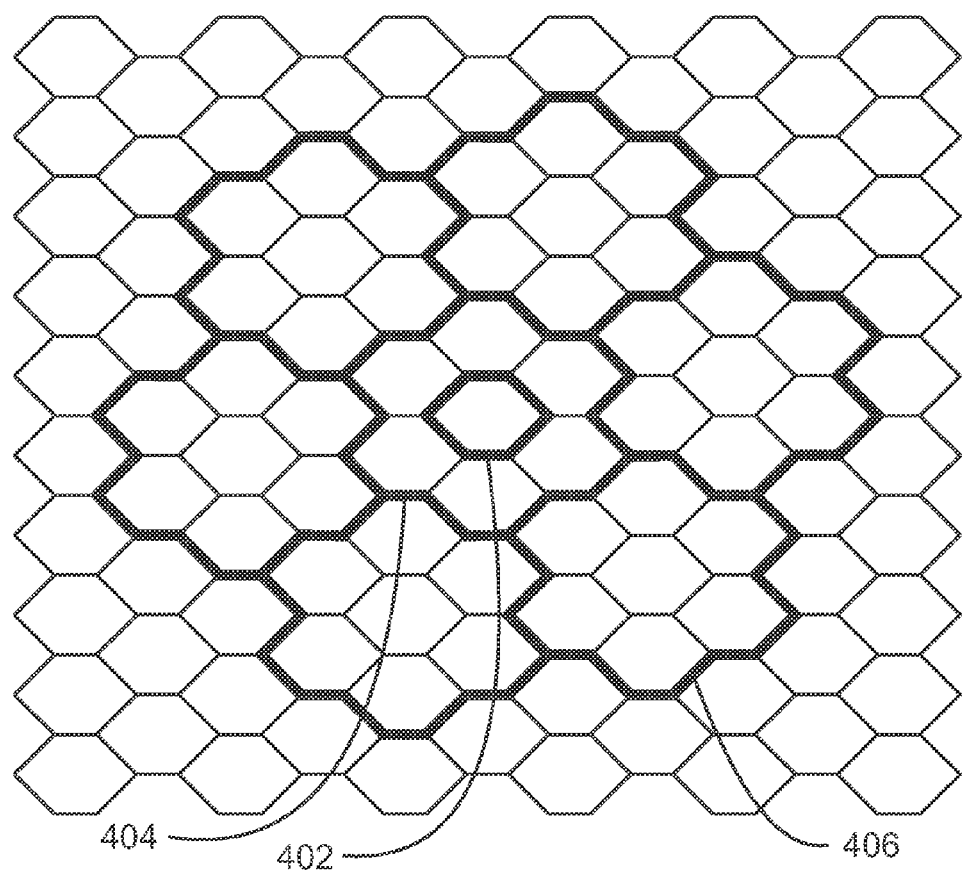
FIG. 4 is a schematic of a recursive hexagonal representation of two-dimensional seismic data.

FIG. 4 is a schematic of a recursive hexagonal representation 400 of two-dimensional seismic data. The recursive hexagonal representation 400 may be generated via recursive hexagonal decomposition of the seismic data into a number of different levels of hexagons. Each level may be associated with one or more aggregates including hexagonal groups referred to as septrees. In various embodiments, hexagonal decomposition is selected over quadrangular decomposition due to the fact that, for hexagonal decomposition, all neighboring aggregates surrounding one aggregate have the same distance to said aggregate. In contrast, for quadrangular decomposition, either only four equally distanced neighbors are used, or all eight neighbors are used with the diagonal neighbors being located at greater distances than the direct neighbors.

As shown in FIG. 4, a first level 402 of the recursive hexagonal representation 400 includes a single hexagon. A second level 404 includes seven hexagons, e.g., a group of six individual hexagons of the first level 402 surrounding another hexagon of the first level 402. A third level 406 includes forty-nine hexagons, e.g., seven groups of seven hexagons of the second level 404. In various embodiments, the recursive hexagonal representation 400 is built in this manner for any number of levels, depending on the size and the amount of seismic data that is to be represented.

To perform the recursive hexagonal decomposition, a numbering scheme that captures level, direction, and position may be used to label the aggregates at different locations and levels. The number scheme may be, for example, a General Balanced Ternary (GBT) that possesses algebra for addition, subtraction, and multiplication of labels and, thus, allows for rapid identification of neighbors in different directions and at different levels. More specifically, the GBT may support hierarchical addressing of space, addressing of arithmetic, mapping of multi-dimensional coordinates to one-dimensional addresses or labels, and efficient computing.

Recursive geometric decomposition of the seismic data into triangles or quadrangles can easily be generalized to three-dimensional space by using tetrahedrons or cubes as the elementary cells or aggregates. For example, recursive hexagonal decomposition may be generalized using permutohedrons. A permutohedron of order n is an (n−1)-dimensional polypore, e.g., a geometric object with flat sides, embedded in an n-dimensional space, the vertices of which are formed by permuting the coordinates of the vector (1, 2, 3, . . . , n). Therefore, a permutohedron of order 3 is a two-dimensional hexagon. A permutohedron of order 4 is a three-dimensional truncated octahedron, as described below with respect to FIG. 5.

Figure 5:
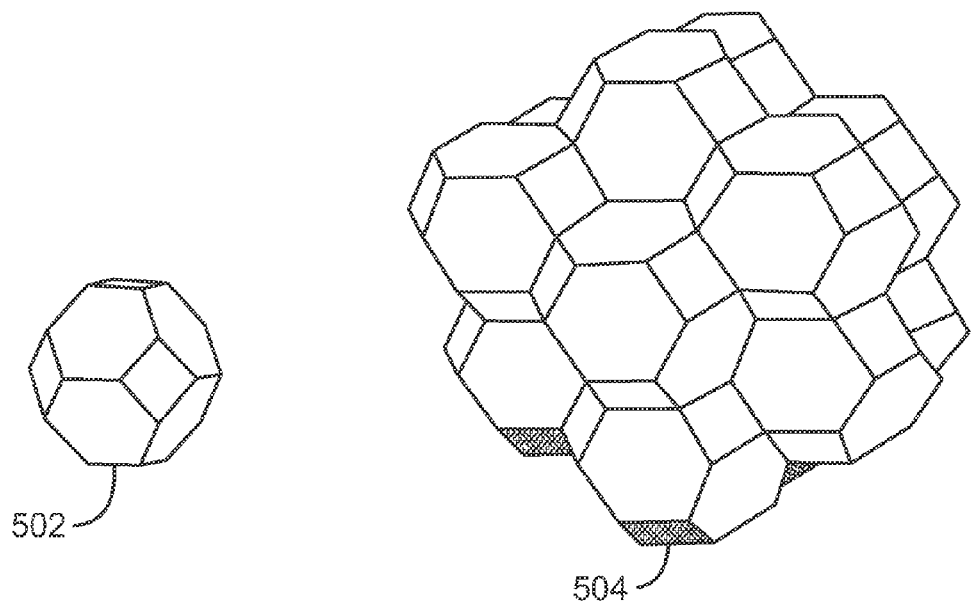
FIG. 5 is a schematic of a hierarchical representation of three-dimensional seismic data generated via the decomposition of the seismic data using permutohedrons.

FIG. 5 is a schematic of a hierarchical representation 500 of three-dimensional seismic data generated via the decomposition of the seismic data using permutohedrons. The permutohedrons shown in FIG. 5 may be truncated octahedrons. A first level 502 of the hierarchical representation 500 includes a single truncated octahedron, and a second level 504 of the hierarchical representation 500 includes fifteen truncated octahedrons, e.g., a group of fifteen individual truncated octahedrons of the first level 502. In various embodiments, a labeling scheme such as GBT is used to generalize the two-dimensional case to higher dimensional cases for hierarchical permutohedral representations.

Figure 6:
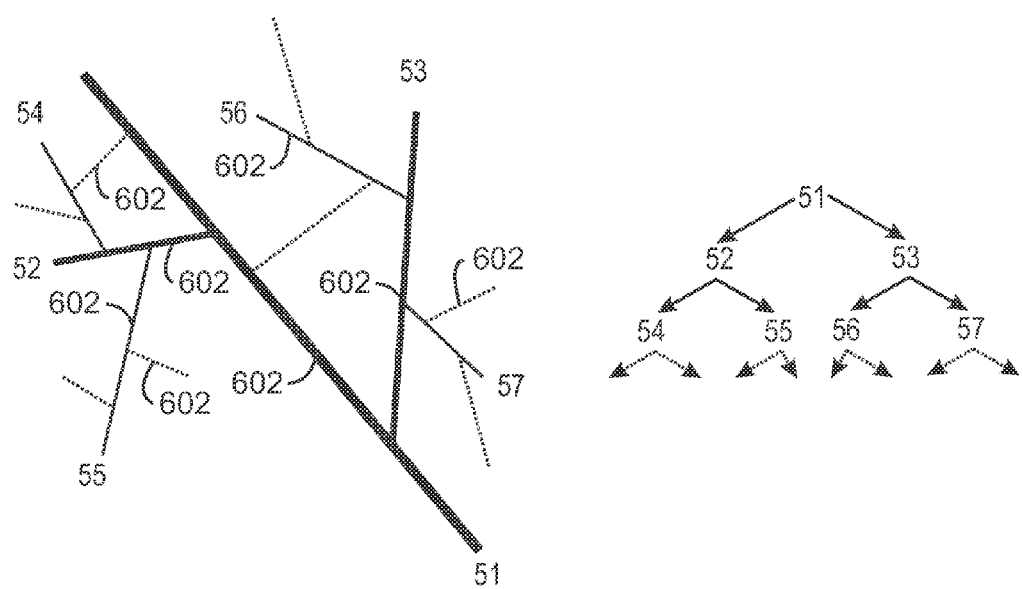
FIG. 6 is a schematic of an alternative representation of seismic data known as a binary space partition (BSP) tree.

FIG. 6 is a schematic of an alternative representation of seismic data known as a binary space partition (BSP) tree 600. The BSP tree 600 may be generated via recursive partitioning of the seismic data, and may not be based on the aggregation of individual cells. It can be applied to seismic data including an arbitrary number of dimensions, although it is often used for two-dimensional or three-dimensional seismic data. The seismic data may be recursively partitioned into a number of partitioning planes 602, as shown in FIG. 6. The BSP tree 600 may include partitioning planes 602 at a root node 51, internal nodes 52 and 53 branching off the root node 51, and objects of interest at terminal leaves 54, 55, 56, and 57 branching off the internal nodes 52 and 53. The edges of the BSP tree 600 may correspond to subspaces, or sides, of the partitioning planes 602. In some embodiments, the BSP tree 600 is constructed via a recursive partitioning procedure, which includes implementing an algorithm that selects a partitioning plane 602 and moves the partitioning plane 602 to a root of the BSP tree 600. Then, the recursive partitioning procedure implements an algorithm that recursively constructs the sub-trees rooted at the children of the node corresponding to the partitioning plane 602.

In various embodiments, the seismic data that are analyzed according to the techniques described herein represent a seismic data volume. The seismic data volume may be three dimensional. However, the different dimensions may be unequal with regard to their sampling rates, scales, or measurement dimensions. The lateral dimension may represent distance to some base point or origin. In many cases, the lateral sample spacing is on the order of tens of meters, e.g., 25 m. The vertical dimension may represent two-way travel time, which is the time it takes for the sound waves to propagate from a source at the surface to a target within the subsurface and back to the receiver at the surface. In many cases, the vertical sample interval is on the order of 4 milliseconds (ms). If time is converted to depth, a 4 ms sample may correspond to a depth increment of 40 m or more, depending on the velocity of sound in the subsurface. Thus, the lateral dimension may have a different physical meaning than the vertical dimension. In addition, even if the lateral and vertical dimensions were converted to the same physical units, they still have different sampling intervals.

According to a seismic data processing technique known as depth migration, an image may be computed with equal sampling distances in all three dimensions. Even with this process, however, the data are unequal with regard to lateral distance versus depth because of resolution issues. All seismic sources and receivers are located at the surfaces, and the sound waves propagate predominantly in the vertical direction. Because of this limited illumination of the subsurface, lateral and vertical resolutions differ. In addition, the targets tend to be thin but laterally extended. For example, a rock layer in the subsurface may be a few meters in thickness, but can extend laterally over tens of kilometers. Thus, neither the target nor the data are isotropic, e.g., they do not exhibit the same properties in the vertical and lateral directions. Recursive geometric decompositions based on aggregating elementary cells, however, may be preferred in isotropic situations because the aggregates grow similarly in all directions when increasing level or scale. Thus, embodiments described herein relate to the representation of three-dimensional data as a stack of two-dimensional recursive representations, as discussed further with respect to FIG. 7.

Figure 7:
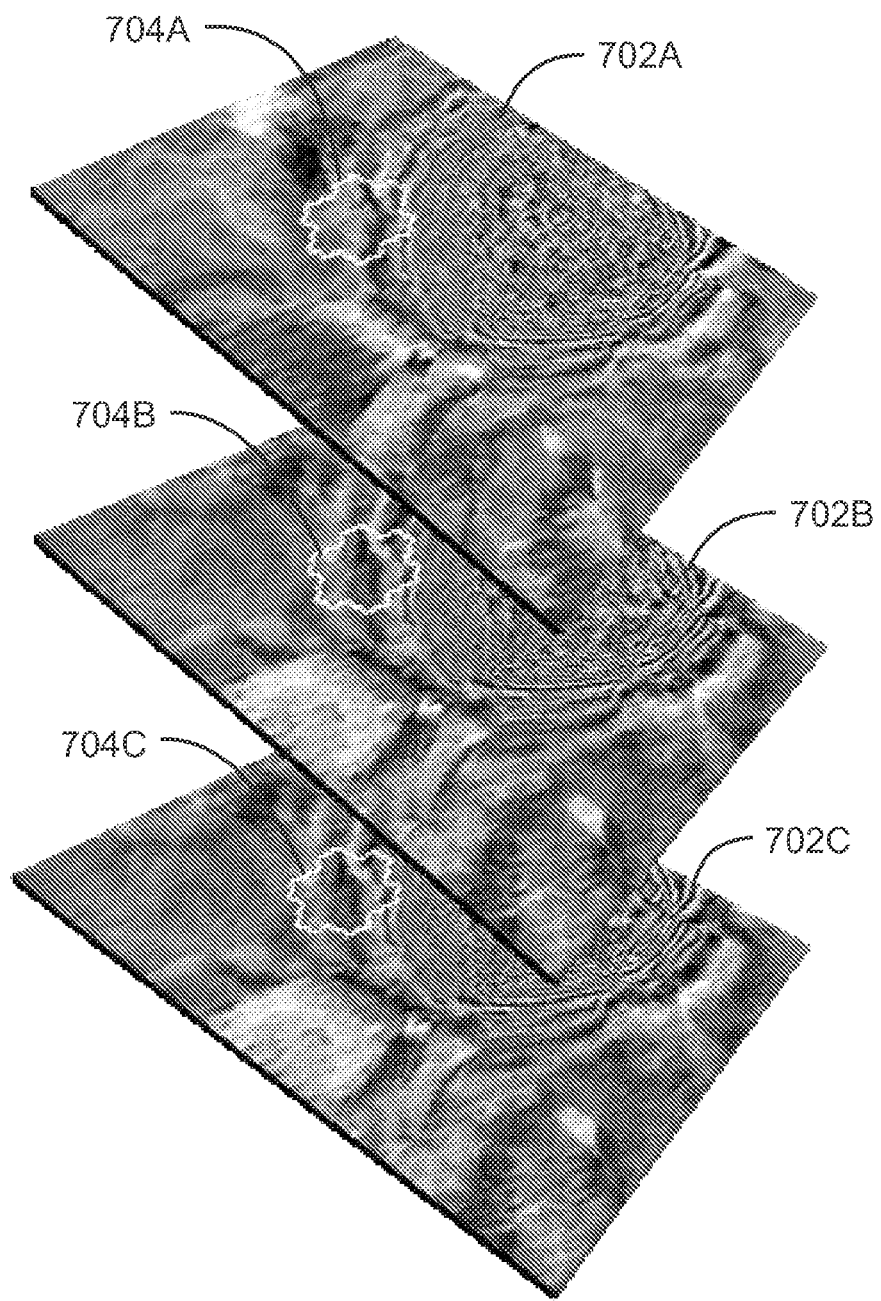
FIG. 7 is a schematic of a representation of a seismic data volume including three consecutive slices through the seismic data volume.

FIG. 7 is a schematic of a representation 700 of a seismic data volume including three consecutive slices 702A, 702B, and 702C through the seismic data volume. The three consecutive slices 702A, 702B, and 702C may be collectively referred to as slices 702. Each of the slices 702 may include one or more aggregates. For example, in FIG. 7, one fourth level aggregate 704A, 704B, or 704C is shown in each of the slices 702. Because the GBT mapping is the same on each of the slices 702, it may be easy to move from one of the slices 702 into an adjacent slices 702, or to consider feature descriptors from adjacent slices 702.

In some embodiments, the slices 702 are aligned with the structure or seismic fabric to extract the slices 702 along the subsurface layering structure. Extracting the slices 702 along the subsurface layering structure may prevent the occurrence of artifacts caused by cutting through the layer structure. The interpreter or the computing system may determine a number of surfaces either manually or automatically, and the slices 702 may be extracted proportionally between such surfaces. Alternatively, the seismic data volume may be flattened via a manual, interactive, or automatic technique that distorts the seismic data in such a way that a majority of the reflections are flat, allowing for the extraction of slices 702 along constant time or depth.

Regardless of the type of hierarchical representation that is used to represent the seismic data, the seismic data may be resampled or interpolated due to the fact that the elementary cells within the representation are not at exactly the same locations as the original seismic data samples. Interpolation methods that may be used include linear interpolation, polynomic interpolation, nonlinear interpolation, or kriging, among others.

In various embodiments, once a first level of the representation has been populated, subsequent levels of the representation may be populated, and feature descriptors may be computed for the each level. Examples of feature descriptors include mean, residue, variance, gradient magnitude, gradient direction, histograms, local textures, and second moments relating to the seismic data. A feature descriptor for an aggregate at any level describes the aggregate's components one level down. For example, feature descriptors at level n are mostly formed from feature descriptors of its level n−1 children or components. The recursive formation of feature descriptors may be initialized by the assignment of the interpolated seismic data values to the means at the first level, while a majority of the other first level feature descriptors are set to zero. In addition, any feature descriptor can be used to form a higher-level feature descriptor. For example, the variance of the gradient direction may be computed as a feature descriptor. The mean for an aggregate at level n may be formed as the average of the means of its level n−1 children. The variance for an aggregate at level n may be defined as the variance between the means of its level n−1 children. Gradient direction and magnitude at level n may be defined as the maximal difference between opposing level n−1 means and the direction thereof. The residue at level n may be the difference between the level n+1 and level n means. The texture of an aggregate at level n may be defined by the mean of the subordinate variances.

Feature descriptors may be computed upfront, e.g., calculated prior to the obtaining of seismic data, and stored for future use. Alternatively, feature descriptors may be computed simultaneously or concurrently. For example, in some cases, common feature descriptors, such as feature descriptors based on lower-level means, may be stored for future use, while other feature descriptors may be computed simultaneously with the processing of the data. The common feature descriptors may be stored within a feature descriptor library of a storage device, for example.

According to embodiments in which a query is performed in a probabilistic manner, the probabilities themselves can be used analogously to entered data for the computation of feature descriptors. Specifically, feature descriptors can be formed from probabilities for one target, which are then mapped to probabilities for another target. This technique may be used for cases in which a complex query is to be built from a number of simpler queries.

Once the representation has been built, a query relating to one or more targets may be identified. In some cases, the interpreter formulates the query to aid in the identification or characterization of the one or more targets. A typical target description may be formulated both in terms of combinations of values of feature descriptors and spatial arrangements that include proximity, orientation, size, and count. Although feature descriptor values can be used directly to describe a target, feature descriptors may also be linked to probabilities of target occurrence. In addition, the target may be described using a vocabulary that may include words such as "dim," "bright," "chaotic," or the like. A new word may be added to the vocabulary by defining a probability function or map that assigns to each aggregate the probability that is has a given property based on its feature descriptors or the relationships between the aggregate and neighboring aggregates.

In some embodiments, spatial relations are imposed by rules that relate to an aggregate, as well its neighbors, parents, and subordinates. The rules may define another property with regard to spatial relations. Rules for examination of any given aggregate include, but are not limited to, a selection of the following rules. More complex rules may be formed by combination using a set selected from the following rules, where each individual rule may be applied to the same property or to an altogether different property. A first rule is that a first property of the given aggregate is irrelevant, but at least one of its neighbors exhibits a specified second property. A second rule is that a first property of the given aggregate is irrelevant, but at least two or more neighbors exhibit a specified second property. A third rule is that, while the given aggregate does not exhibit a specified first property, at least one of its neighbors exhibits a specified second property. A fourth rule is that neither the aggregate nor any of its neighbors exhibits a specified property. A fifth rule is that, while the given aggregate exhibits a specified first property, at least one of its neighbors does not exhibit a specified second property. A sixth rule is that the given aggregate exhibits a specified first property, and at least a specified number of its neighbors exhibit a specified second property. A seventh rule is that at least one subordinates of the given aggregate exhibits a selected property. An eighth rule is that the parent of the given aggregate exhibits a selected property. Within each of these eight rules, the first and second properties may be the same or they may be different. Further, any number of additional rules may be specified.

The vocabulary definitions and rules may be integrated into a probabilistic framework. The spatial relationships or rules can be translated into probabilities by applying Bayesian rules to the probabilities of each aggregate's neighbors, parents, and subordinates. A technique for translating rules into probabilities is described below with respect to a recursive hexagonal representation, as an example.

Consider an aggregate for which the probability of exhibiting some property is $P_0$. In a two-dimensional GBT space formed by hierarchical decomposition of the plane based on hexagons, this aggregate has six neighbors, with probabilities $P_i$ for $i=1, \ldots, 6$. The probability that the aggregate and all of its neighbors belong to this class is as shown below in Eq. (1).

$$P(N=7) = \Pi_{i=0}^{6} P_i \quad (1)$$

The probability that neither the aggregate nor its neighbors belong to this class is as shown below in Eq. (2).

$$P(N=0) = \Pi_{i=0}^{6} (1-P_i) \quad (2)$$

The probability that the aggregate and at least two of its neighbors share the same property is as shown below in Eq. (3).

$$P(N \geq 3) = P_0 (1 - \Pi_{i=0}^{6}(1-P_i) - \Sigma_{i=1}^{6} P_i \Pi_{j=1, j \neq i}^{6}(1-P_j)) \quad (3)$$

Additional property probabilities can be formed using the Bayes theorem, which states that $P(A|B)P(B)=P(B|A)P(A)$. This, in turn, may be expanded to $P(A_i|B)\Sigma P(B|A_j)P(A_j)=P(B|A_i)P(A_i)$. In some cases, computation of probabilities by combinatorial summation or factorization may be inefficient due to the many cases or terms that are to be considered. Therefore, exact computation may be replaced by asymptotic approximation, for example, by invoking the central limit theorem. In some cases, probabilities may also be computed by Monte Carlo simulation.

The integrated probabilities may be computed for at least one aggregate. In some cases, the integrated probabilities are evaluated for essentially all aggregates. In some cases, the integrated probabilities are evaluated at essentially all levels. In some cases, the integrated probabilities are evaluated for all aggregates at all levels. In some cases, the integrated probabilities are evaluated for selected aggregates at selected levels. The overall result that is obtained represents the probability that the aggregates satisfy the target description specified by the query. In some embodiments, the interpreter validates the detected targets or prospects. The interpreter may then determine any appropriate modifications to the query, such as modifications to the target descriptions, vocabulary definitions, maps, or rules. The modified query may then be executed in the same manner as the original query. This process may be repeated until a satisfactory result is obtained.

Figure 8:
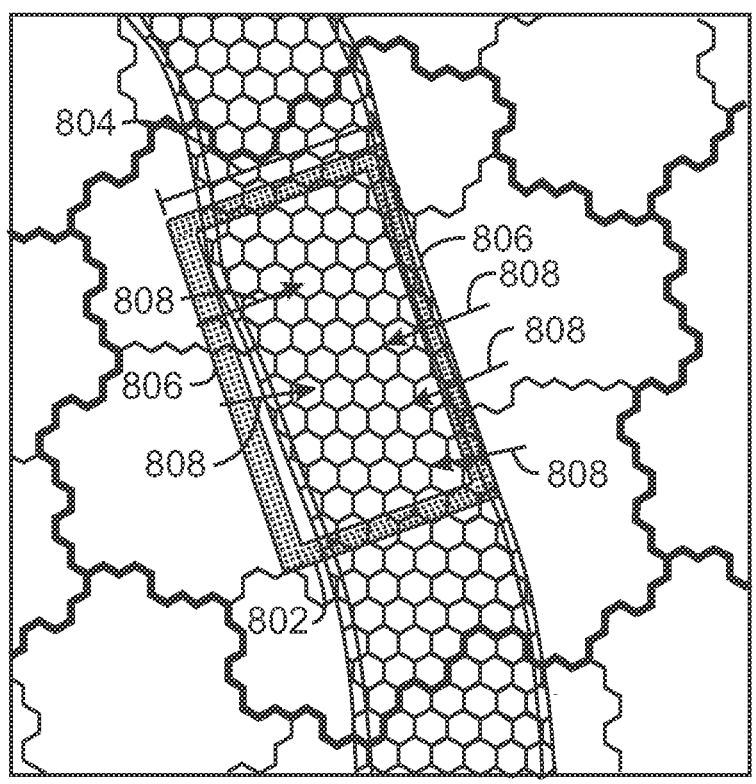
FIG. 8 is a schematic of a representation of a channel running through a hierarchical multi-scalar decomposition.

FIG. 8 is a schematic of a representation 800 of a channel 802 running through a hierarchical multi-scalar decomposition. According to the embodiment shown in FIG. 8, seismic data may be analyzed to identify one or more channels, e.g., the channel 802, within a subsurface represented by the seismic data. The channel 802 may have a limited width 804, e.g., less than 10 cells. The two sides 806 of the channel 802 may have opposing gradients 808, that is, the two sides 806 may exhibit pairs of opposing gradients 808. In addition, the gradients 808 may vary slowly along each side 806 of the channel 802.

Figure 9:
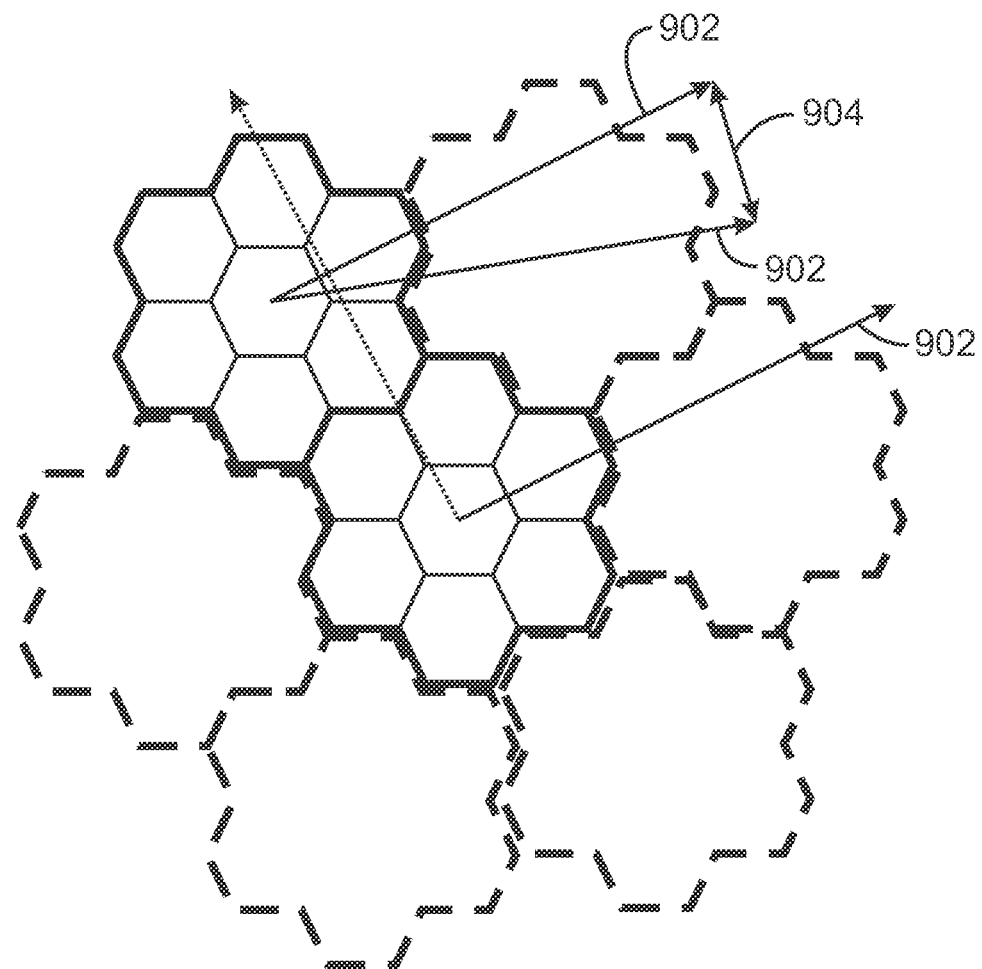
FIG. 9 is a schematic showing a technique for quantifying slowly varying gradients along a channel edge or, in other words, quantifying gradient similarity along the channel edge.

FIG. 9 is a schematic 900 showing a technique for quantifying slowly varying gradients 902 along a channel edge or, in other words, quantifying gradient similarity along the channel edge. For a given aggregate, the gradient direction and magnitude is either computed or retrieved from storage. The gradient 902 may be oriented perpendicular to the channel. Thus, the gradient 902 may be rotated by 90° to obtain the hypothetical channel orientation. The hypothetical channel orientation may be used to select the one of said aggregate's seven neighboring aggregates that may also lie on the channel edge. The gradients 902 of the given and selected aggregate may be compared to determine a similarity 904 between the gradients 902. A low similarity 904 may suggest that the given aggregate does not constitute a portion of the channel 802, while a high similarity 904 may suggest that the given aggregate is likely to constitute a portion of the channel 802. In addition, the similarities 904 between the gradients 902 of neighboring aggregates may be translated into probabilities, as discussed below with respect to FIG. 10.

Figure 10:
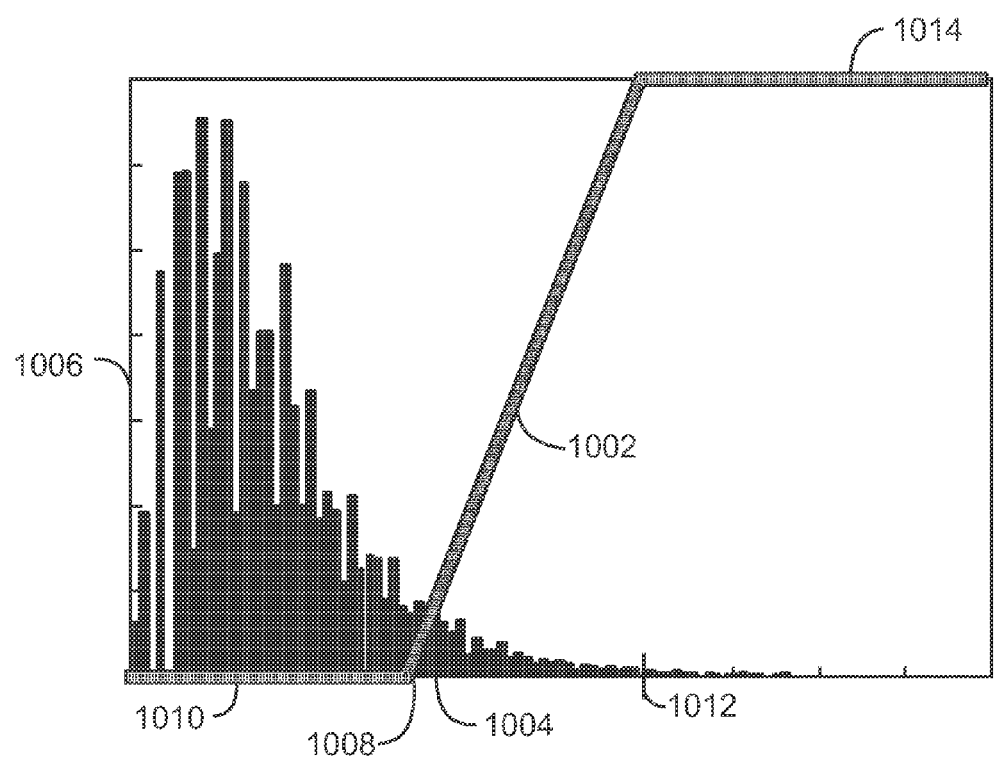
FIG. 10 is a graph showing a translation of the similarities between the gradients into probabilities that the aggregates associated with the gradients are a portion of the channel.

FIG. 10 is a graph 1000 showing a translation of the similarities 904 between the gradients 902 (shown as a histogram) into probabilities 1002 that the aggregates associated with the gradients 902 are a portion of the channel 802. Like numbered items are as described with respect to FIGS. 8 and 9. An x-axis 1004 of the graph 1000 represents the similarities 904 between the gradients 902, and a y-axis 1006 of the graph 1000 represents the associated probabilities 1002. The similarities 904 may be translated or mapped to the probabilities 1002 using a similarity histogram, a ramp-like probability model with two thresholds specified by the interpreter, or any other specified function. Similarities 904 below a lower threshold 1008 may be assigned a lower probability 1010 of zero, while similarities 904 exceeding an upper threshold 1012 may be assigned an upper probability 1014 of one. Between the lower threshold 1008 and the upper threshold 1012, the probabilities 1002 may increase linearly. The interpreter may adjust the thresholds 1008 and 1012, or may change the probability model to refine the mapping of the similarities 904 to the probabilities 1002.

Figure 11:
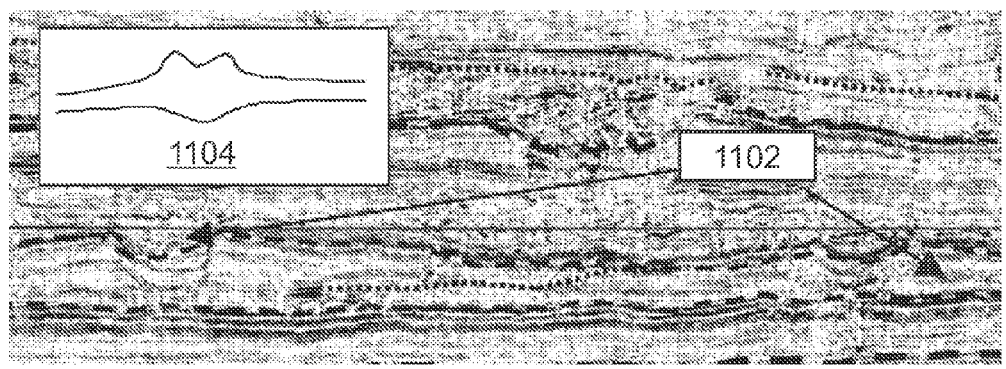
FIG. 11 is a schematic of a representation of seismic data including a channel based on a gull-wing geometry of the channel.
Figure 12:
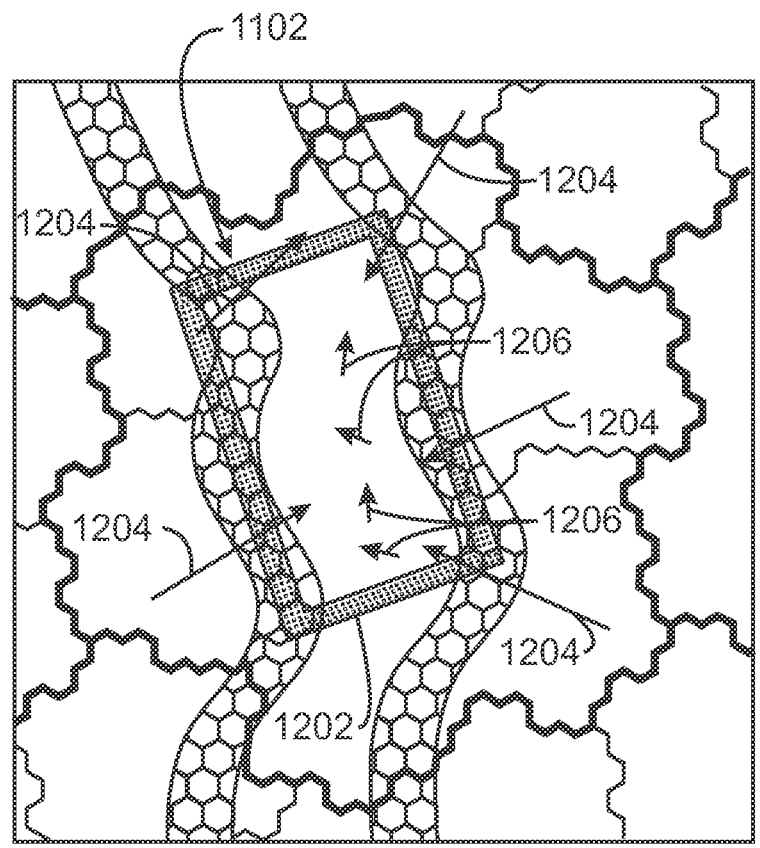
FIG. 12 is a schematic showing an intersection of the channel with the gull-wing geometry with a seismic time slice.

FIG. 11 is a schematic of a representation 1100 of seismic data including two channels 1102 based on a gull-wing geometry 1104 of the channels 1102. Such a gull-wing geometry 1104 is common among channels represented by seismic data. FIG. 12 is a schematic 1200 showing an intersection of the channel 1102 with the gull-wing geometry 1104 with a seismic time slice 1202. Cutting through such a gull-wing geometry 1104 with a seismic time slice 1202 can enhance the amplitude contrasts. In some cases, the center of the channel 1102 and the edges of the channel 1102 may also differ in amplitude polarity. The amplitude polarities at the edges of the channel 1102 are indicated by arrows 1204, while the amplitude polarities at the center of the channel are indicated by arrows 1206.

Embodiments described herein may also be used to analyze seismic data to identify one or more seismic bright spots within the subsurface represented by the seismic data. A seismic bright spot may result from sudden changes in the acoustic properties of the subsurface, such as when a shale layer overlies sand, with gas filling its pores. A seismic bright spot is an example of a geophysical anomaly and is often called a direct hydrocarbon indicator (DHI) because it may be caused by the presence of hydrocarbons, and thus, may directly indicate an accumulation of hydrocarbons. Seismic bright spots usually have bright amplitudes, exceed a minimal width, e.g., 100 samples or traces within the original seismic data set, and are not located too close to dark or dim areas. In some cases, the mean amplitudes of the aggregates may be the only feature descriptor that is defined for a seismic bright spot. The vocabulary definitions specific to this description may include "bright," "minimum," "close," and "dark." Translation may again be performed using model probability distributions that are parameterized using the specific vocabulary.

Figure 13A:
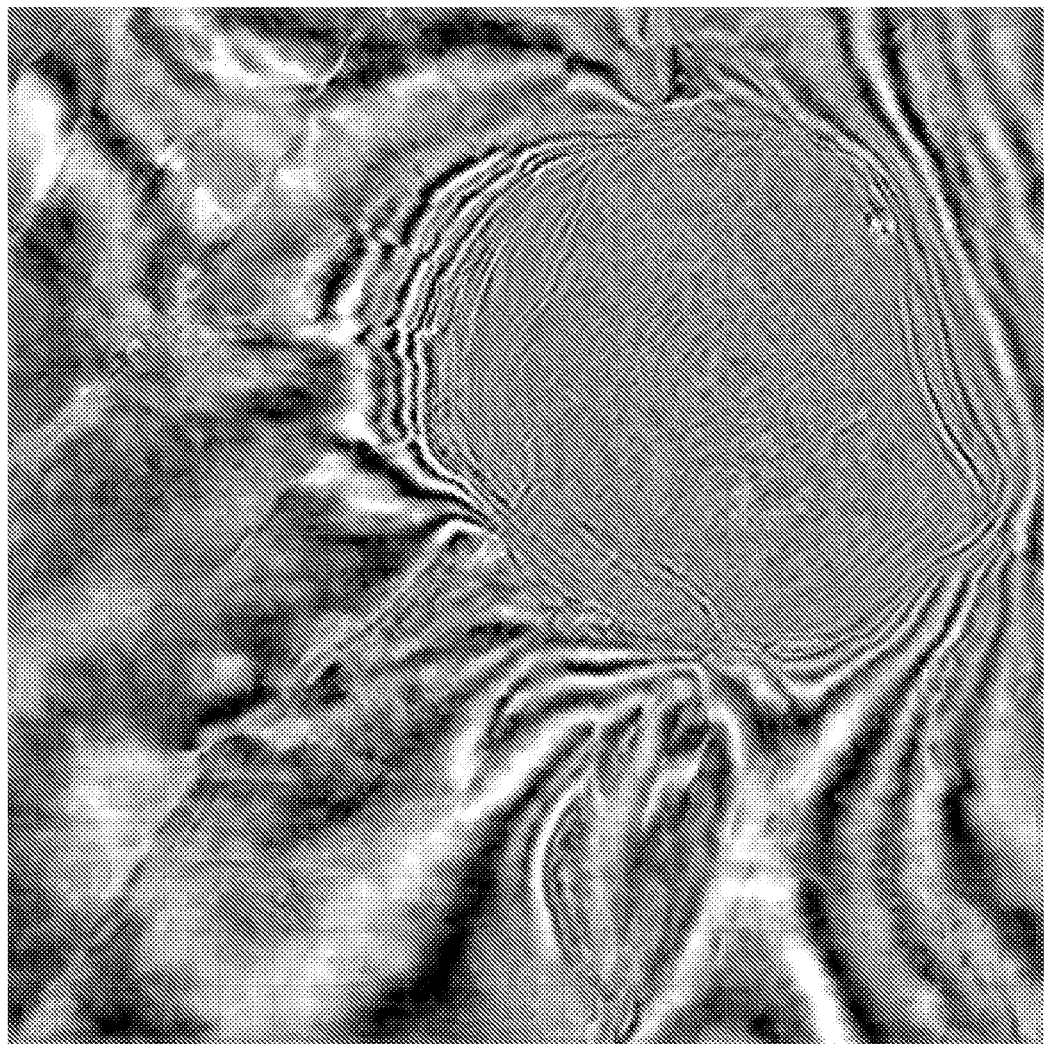
FIG. 13A is a schematic showing a slice through a seismic amplitude volume.
Figure 13B:
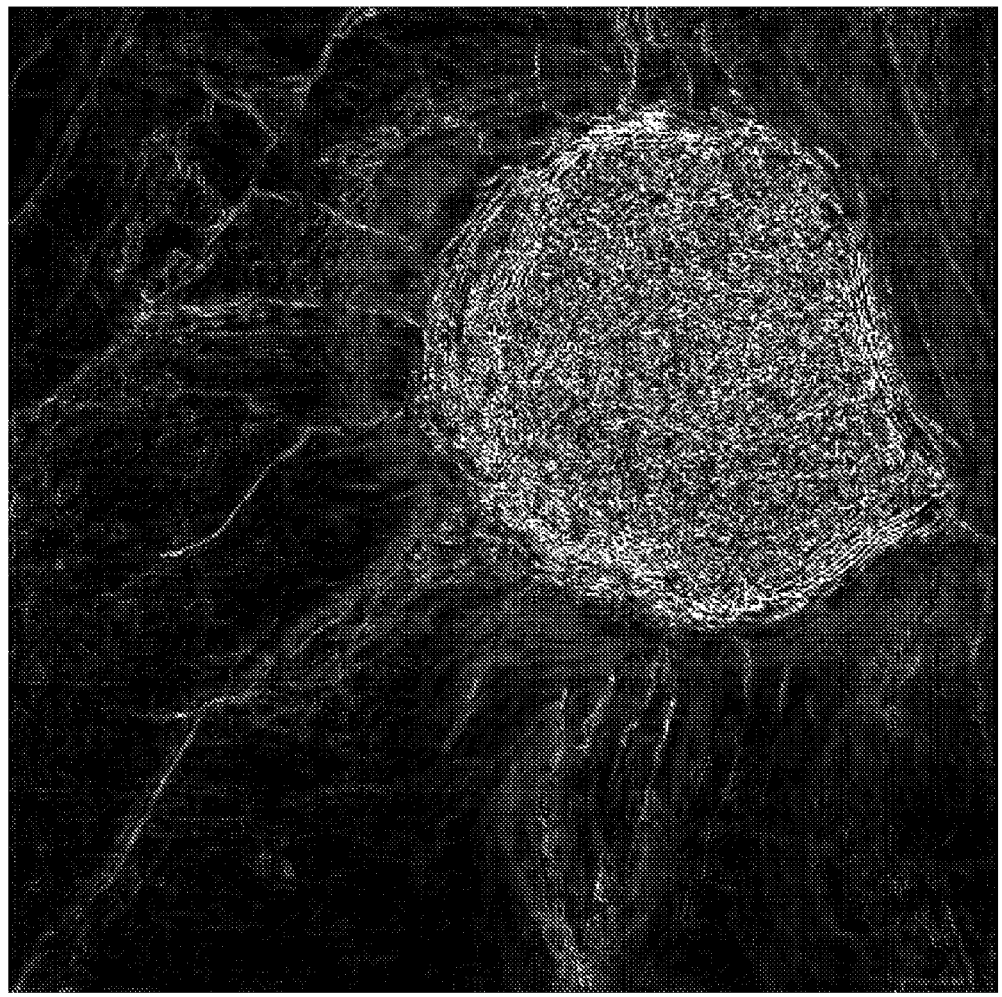
FIG. 13B is a schematic showing a slice through a discontinuity attribute volume.

In addition, embodiments described herein may be used to analyze seismic data to identify one or more salt domes within the subsurface represented by the seismic data. The seismic data used to identify one or more salt domes may include a seismic amplitude volume and a discontinuity attribute volume. The interpreter may develop a description based on both the seismic amplitude volume and a discontinuity attribute volume. FIG. 13A is a schematic showing a slice 1300 through a seismic amplitude volume. FIG. 13B is a schematic showing a slice 1302 through a discontinuity attribute volume. Both slices 1300 and 1302 may be represented using two-dimensional recursive hexagonal representations. The feature descriptors that are calculated for both slices 1300 and 1302 include mean, variance, texture, gradient magnitude, and gradient direction for the different aggregates.

The interpreter may describe a salt dome based on the discontinuity data by stating that regions overlapping with the salt dome are very discontinuous and, thus, appear bright on the discontinuity data. Salt regions in the discontinuity data also have a large variability and, thus, have a high statistical variance.

Figure 14:
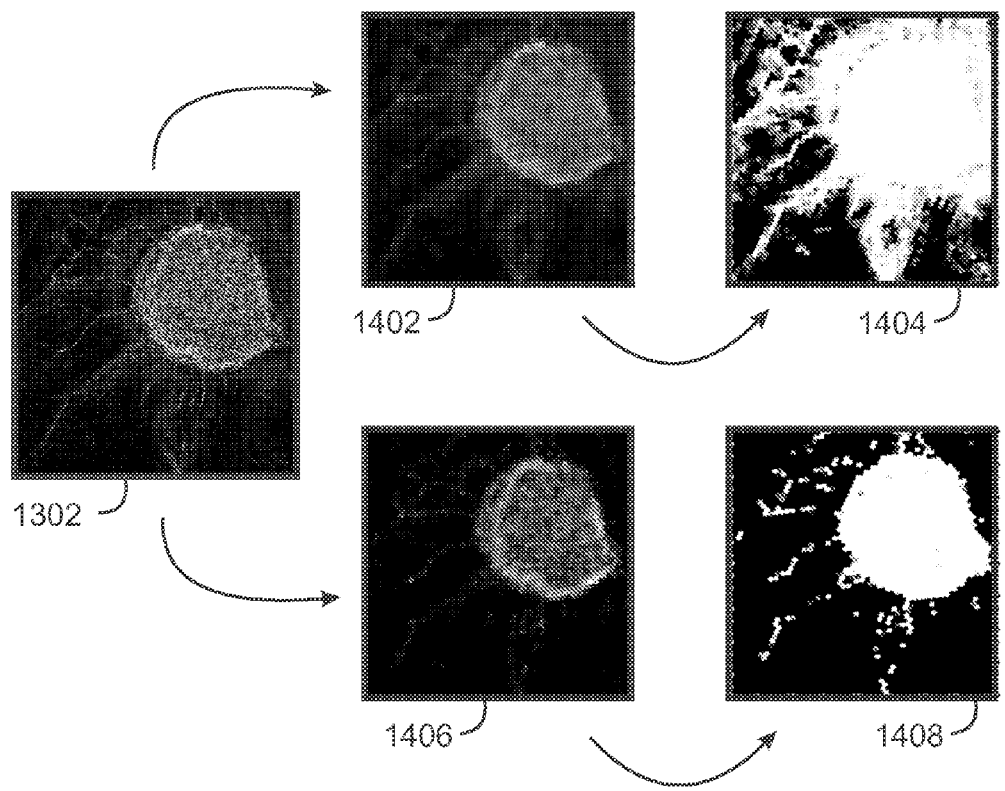
FIG. 14 is a schematic showing results of this translation for the slice through the discontinuity attribute volume.

The system may translate the salt dome region description such that aggregates with high mean discontinuities and high discontinuity variance are identified as regions of a salt dome. FIG. 14 is a schematic 1400 showing results of this translation for the slice 1302 through the discontinuity attribute volume. Like numbered items are as described with respect to FIG. 13. As shown in FIG. 14, a mean 1402 may be calculated for each second level aggregate within the slice 1302, and the mean 1402 may be translated to a high mean discontinuity probability 1404. In addition, a variance 1406 may be calculated for each second level aggregate within the slice 1302, and the variance 1406 may be translated to a high discontinuity variance probability 1408. If both the high mean discontinuity probability 1404 and the discontinuity variance 1408 are high for a particular aggregate, the aggregate may be considered to be a region of a salt dome.

Figure 15:
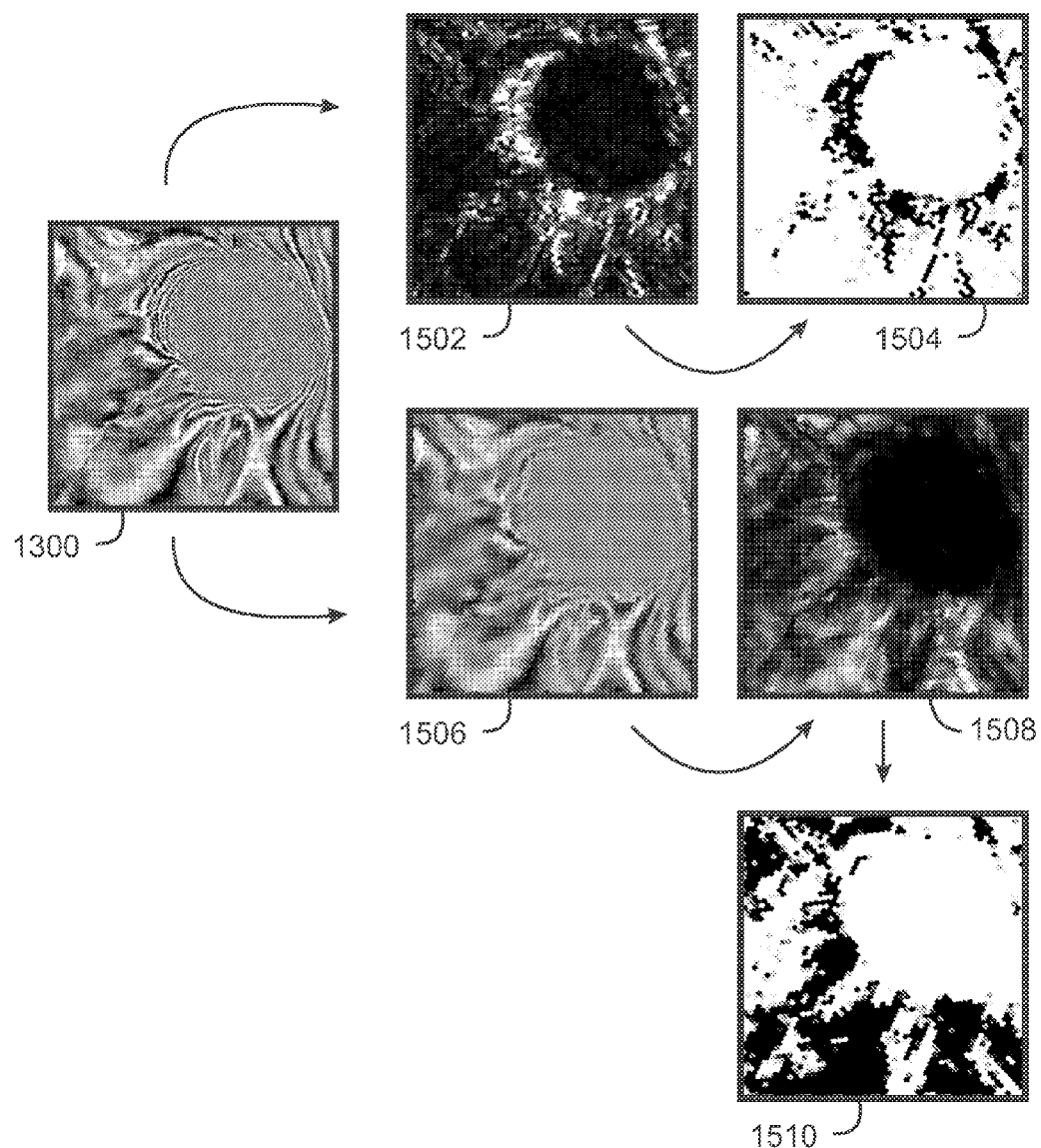
FIG. 15 is a schematic showing results of the translation of the slice through the seismic amplitude volume.

FIG. 15 is a schematic 1500 showing results of the translation of the slice 1300 through the seismic amplitude volume. Like numbered items are as described with respect to FIG. 13. The texture of the amplitude data may be uniform within the second level aggregates of the slice 1300. Additionally, the mean amplitudes for second level aggregates may be fairly consistent between neighboring slices. Therefore, high salt probabilities may be assigned to aggregates that have low texture values and low variance between neighboring slices.

As shown in FIG. 15, a texture 1502 may be calculated for each third level aggregate within the slice 1300, and the texture 1502 may be translated to a probability 1504 of low texture variability. In addition, a mean 1506 may be calculated for each third level aggregate within the slice 1300, and a variance 1508 between the slice 1300 and other neighboring slices may be determined. The variance 1508 between the slice 1300 and other neighboring slices may be translated to a probability 1510 of low variance between slices. If both the probability 1504 of low texture variability and the probability 1510 of low variance between slices are high for a particular aggregate, the aggregate may be considered to be a region of a salt dome.

Figure 16:
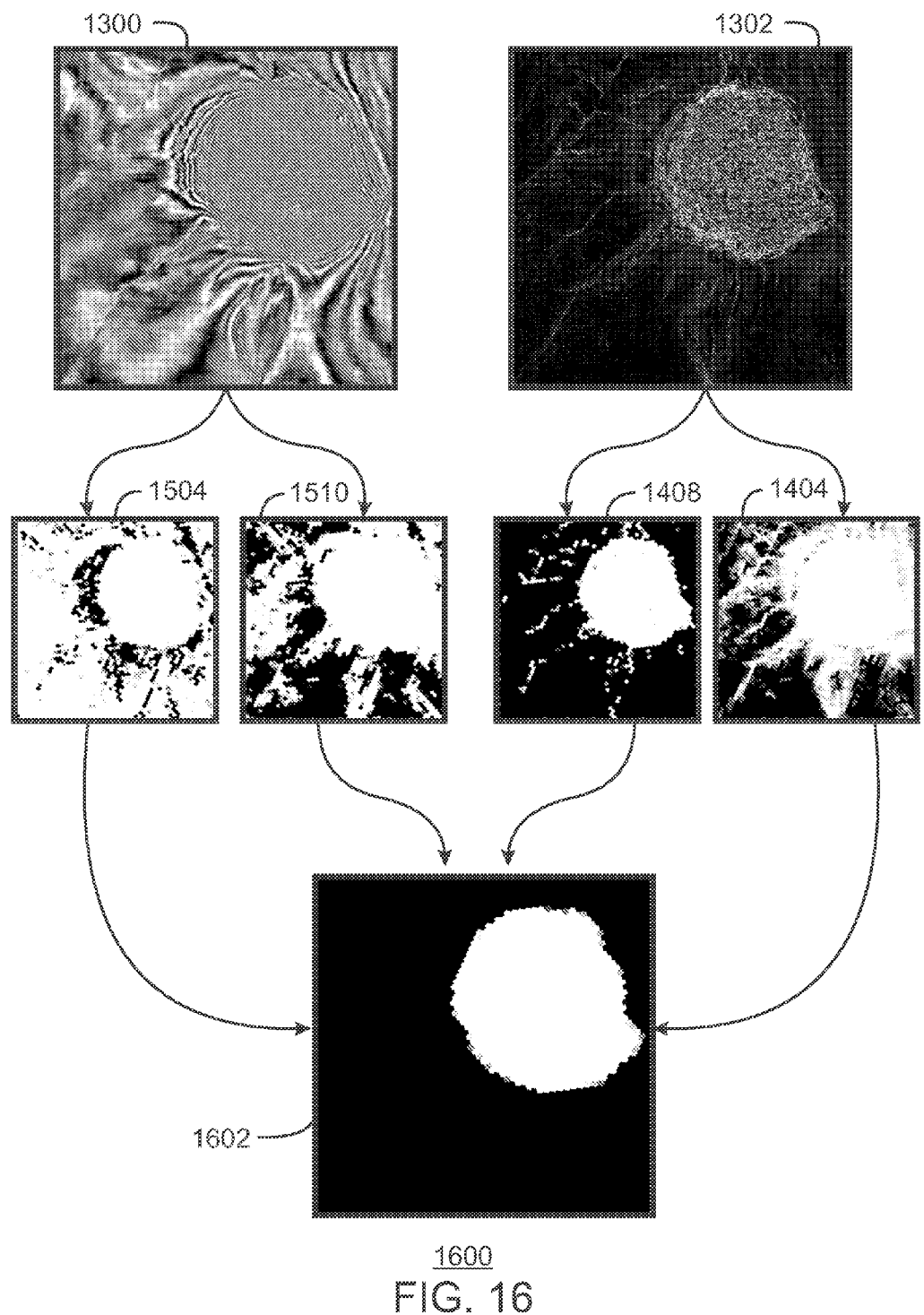
FIG. 16 is a schematic showing a combination of the translation of both of the slices.

FIG. 16 is a schematic 1600 showing a combination of the translation of both of the slices 1300 and 1302. Like numbered items are as described with respect to FIGS. 13, 14, and 15. By combining the descriptions for the seismic amplitude volume and the discontinuity attribute volume, a salt probability volume is formed. A slice 1602 through this salt probability volume is shown in FIG. 16, where the slice 1602 may be described as being made up of regions that are very discontinuous and have high variability in the discontinuity data. Specifically, the amplitude of the slice 1300 is translated to the probability of low texture variability 1504 and the probability of low variance between slices 1510. The discontinuity of the slice 1302 is translated to the high discontinuity variance probability and the high mean discontinuity probability 1404. The values 1404, 1408, 1504 and 1510 are all combined in a salt probability of the slice 1602. In addition, the salt dome region may have consistent amplitudes between nearby slices.

Figure 17:
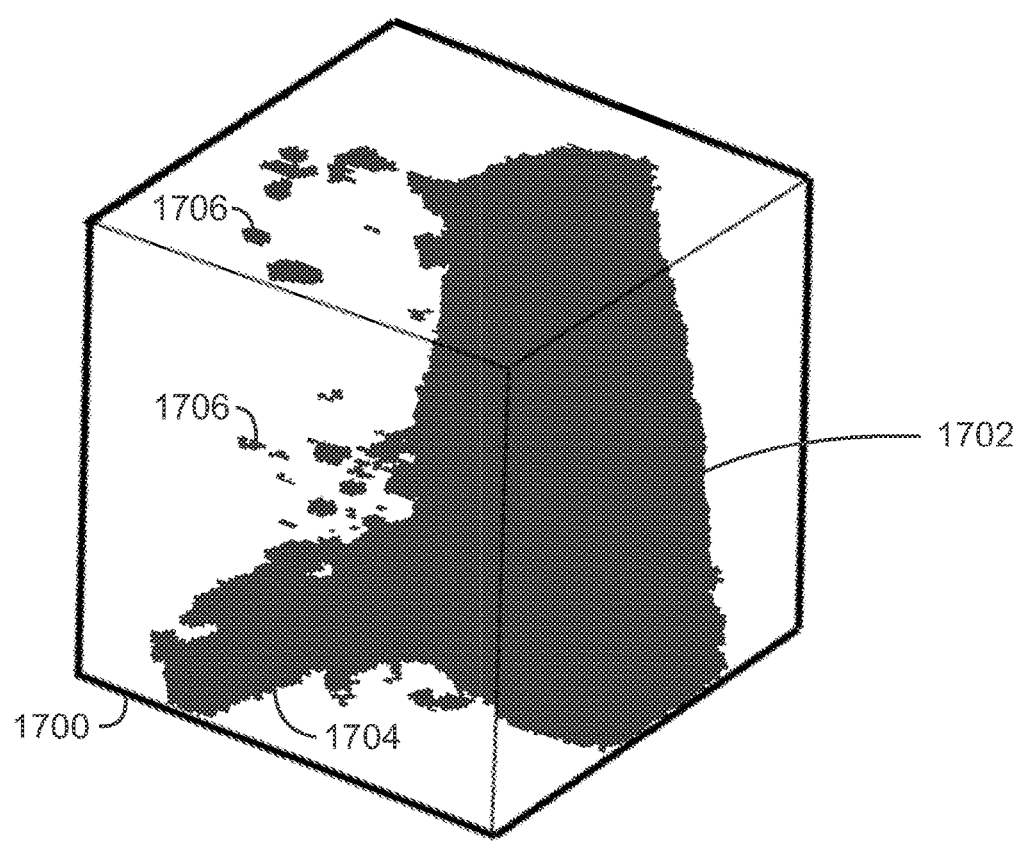
FIG. 17 is a schematic showing a salt probability volume within a three-dimensional representation of a subsurface using the techniques described above with respect to FIGS. 13-16.

FIG. 17 is a schematic showing a salt probability volume within a three-dimensional representation 1700 of a subsurface using the techniques described above with respect to FIGS. 13-16. The techniques may be applied to all slices of the three-dimensional representation 1700 to compute a salt probability volume. The dominant feature in the salt probability volume is a dome shaped feature 1702, which represents a salt dome. A spur 1704 is attached to the dome shaped feature 1702. The spur 1704 may be identified as a mass transport complex. In addition, minor regions 1706 that are likely to be caused by noisy data may be identified within the three-dimensional representation. In some cases, to separate features such as the mass transport complex or the noise blobs from the salt dome, the interpreter may refine the query description.

Embodiments described herein may also be used to analyze seismic data to identify one or more faults within the subsurface represented by the seismic data. In terms of discontinuity data, a fault may be represented by narrow, bright, and linear features that extend across multiple neighboring slices of a representation. In other words, faults are usually "bright," meaning that they are discontinuous, narrow and linear, and persist across multiple slices. Thus, aggregates that contain faults are usually small, e.g., first level aggregates, and have high values of mean discontinuity.

To highlight narrow, linear features, a Laplacian or Gaussian operator may be applied to the discontinuity data, and the result may be combined with the high mean discontinuity results. In addition, the slice-by-slice results may be combined across slices to find features that persist throughout neighboring slices. Such features may be used to define a first estimate of fault probabilities for the representation. Examination of these first fault probabilities may reveal that some regions inside the identified salt dome region are also compatible with the applied fault description. Therefore, the interpreter may refine the fault description by adding the rule that no faults are located in salt dome regions. Final fault probabilities could be formed using the rule that first fault probabilities are high, but salt probabilities are low.

In some embodiments, the amplitude anomalies that are adjacent to a fault or a salt dome are determined. An amplitude anomaly is characterized by anomalously high amplitude magnitudes that may indicate the presence of hydrocarbons. Amplitude anomalies can result from changes in acoustic properties, such as when a sand containing natural gas underlies shale, in which case the term is synonymous with bright spot. Amplitude anomalies, or bright spots, are examples of DHIs because they may be caused by the presence of hydrocarbons, and thus, may directly indicate an accumulation of hydrocarbons.

Amplitude anomalies can be characterized as having bright or dark areas in the amplitude data, as well as high variability between neighboring slices. An anomalous amplitude probability can be computed by combination of the probabilities for a high mean amplitude magnitude and high variance of amplitude means between neighboring slices. The computed anomalous amplitude probability may be used to determine a possible presence of a salt flank or a fault trap within the subsurface represented by the seismic data.

FIG. 18 is a simplified process flow diagram of a method 1800 for analyzing seismic data. The method 1800 may be implemented by any suitable type of computing system, such as the interpreter system 104 described above with respect to FIG. 1. In various embodiments, the method 1800 is used to identify prospects within a subsurface represented by the seismic data. The prospects may include geological features or geophysical features of the subsurface. For example, the prospects may include channels, salt bodies, faults, or geophysical abnormalities. In addition, the prospects may be regions of the subsurface that include, or are likely to include, hydrocarbons.

The method 1800 begins at block 1802, at which a representation of a seismic data set is identified. The seismic data may include data relating to a particular region of a subsurface that is obtained via seismic imaging techniques. The representation may be a recursive geometric representation, such as a recursive quadrangular representation or a recursive hexagonal representation. In various embodiments, the recursive geometric representation is recursive in at least one dimension. The recursive geometric representation may include a number of two-dimensional layers of cells stacked in a hierarchical manner.

At block 1804, feature descriptors corresponding to each of a number of aggregates within the representation are determined. The feature descriptors may be numerical values or numerical ranges corresponding to geological or geophysical features of the subsurface represented by the seismic data. Such feature descriptors may include, for example, mean values, variances, textures, or gradients corresponding to the seismic data.

In various embodiments, the aggregates within the representation are partitioned according to a number of levels, wherein each level includes aggregates of a specified resolution. Feature descriptors corresponding to each aggregate may then be determined by analyzing a lowest level of the representation to determine feature descriptors corresponding to each aggregate within the lowest level, and upscaling the feature descriptors for the lowest level to identify feature descriptors corresponding to each aggregate within a next lowest level of the representation.

At block 1806, a query relating to the representation and one or more vocabulary definitions relating to the query are identified. The query may be a request to identify specific targets. For example, the query may be a request to identify prospects within the subsurface represented by the seismic data.

In some embodiments, the query and the one or more vocabulary definitions are identified in response to input from a user of the computing device executing the method 1800. The user of the computing device may be, for example, an interpreter who initiated the query. In other embodiments, the query and the one or more vocabulary definitions are identified within a storage device located on the computing device.

At block 1808, the representation is analyzed to compute the likelihood that each aggregate satisfies the query. In some embodiments, the representation is analyzed based on a level specified by the query to compute a likelihood that each aggregate within the level satisfies the query. This may be accomplished by analyzing the feature descriptors for each aggregate to determine a probability that the feature descriptors correspond to targets specified by the query. Further, in addition to determining a probability that an aggregate represents a specific target, the exact location of the target within the representation, as well as the characteristics of the target, may be determined.

In some embodiments, the likelihood that each aggregate satisfies the query is determined by comparing feature descriptors for a particular aggregate to feature descriptors for a number of surrounding aggregates. The likelihood that the aggregate satisfies the query may then be determined based on the comparison.

At block 1810, the result of the query is returned. For example, the result of the query may be returned to the interpreter who initiated the query. In addition, the result of the query may be validated. For example, the result of the query may be validated in response to input from the interpreter verifying the validity of the query. If the result cannot be validated, modifications to the feature descriptors, the query, or the one or more vocabulary definitions, or any combinations thereof, may be determined. The determined modifications may be implemented by executing the modified query. This may be repeated until a valid result is obtained.

The process flow diagram of FIG. 18 is not intended to indicate that the blocks of the method 1800 are to be executed in any particular order, or that all of the blocks are to be included in every case. Further, any number of additional blocks not shown in FIG. 18 may be included within the method 1800, depending on the details of the specific implementation.

Embodiments of the invention may include any combinations of the methods and systems shown in the following numbered paragraphs. This is not to be considered a complete listing of all possible embodiments, as any number of variations can be envisioned from the description above.

1. A method for analyzing seismic data, including:
identifying, via a computing device, a representation of a seismic data set;
determining a number of feature descriptors corresponding to each of a number of aggregates within the representation;
identifying a query relating to the representation and one or more vocabulary definitions relating to the query;
analyzing the representation to compute a likelihood that each of the number of aggregates satisfies the query; and
returning a result of the query.

2. The method of paragraph 1, wherein the representation is hierarchical.

3. The method of any one of paragraphs 1 or 2, including partitioning the number of aggregates within the representation according to a number of levels, wherein each of the number of levels includes aggregates of a specified resolution.

4. The method of paragraph 3, wherein determining the number of feature descriptors corresponding to each of the number of aggregates includes:
analyzing a lowest level of the representation to determine feature descriptors corresponding to each of a number of aggregates within the lowest level; and
upscaling the feature descriptors for the lowest level to identify feature descriptors corresponding to each of a number of aggregates within a next lowest level of the representation.

5. The method of paragraph 4, wherein each of the number of aggregates includes one cell.

6. The method of any one of paragraphs 1 to 3, wherein analyzing the representation to compute the likelihood that each of the number of aggregates satisfies the query includes:
comparing feature descriptors for a first aggregate to feature descriptors for a number of surrounding aggregates; and
determining a likelihood that the first aggregate satisfies the query based on the comparison.

7. The method of any one of paragraphs 1 to 3 or 6, including:
validating the result of the query;
if the result cannot be validated, determining modifications to the feature descriptors, the likelihood definitions, the query, or the one or more vocabulary definitions, or any combinations thereof; and
implementing the determined modifications.

8. The method of any one of paragraphs 1 to 3, 6, or 7, including identifying the query and the one or more vocabulary definitions in response to input from a user of the computing device.

9. The method of any one of paragraphs 1 to 3 or 6 to 8, including identifying or characterizing prospects within a subsurface represented by the seismic data based on the query, wherein the prospects include geological features or geophysical features, or both.

10. The method of any one of paragraphs 1 to 3 or 6 to 9, wherein determining a number of feature descriptors corresponding to an aggregate includes determining at least one of a mean value, a variance, a texture, or a gradient, or any combinations thereof, for the seismic data represented by the aggregate.

11. The method of any one of paragraphs 1 to 3 or 6 to 10, wherein identifying the one or more vocabulary definitions includes identifying definitions of words within the query, definitions of rules relating to the query, or definitions of maps between the number of feature descriptors and corresponding probabilities, or any combinations thereof.

12. The method of any of paragraphs 1 to 3 or 6 to 11, wherein the feature descriptors include numerical values, and wherein the method includes determining geological features or geophysical features, or both, of a subsurface represented by the seismic data based on the numerical values.

13. The method of any of paragraphs 1 to 3 or 6 to 12, including:
determining a number of feature descriptors corresponding to any of the number of aggregates within the representation, wherein the number of feature descriptors relate to a desired prospect of a subsurface represented by the seismic data to be identified or characterized, or both; and
analyzing the representation to compute a likelihood that each of the number of aggregates corresponds to a region of the subsurface including the desired prospect.

14. A system for analyzing seismic data, including:
a processor;
a storage medium including:
a representation of a seismic data set, wherein the representation includes a representation including a number of aggregates; and
a number of feature descriptors corresponding to each of the number of aggregates within the representation; and
a non-transitory machine readable medium including code configured to direct the processor to:
identify a query relating to the representation and one or more vocabulary definitions relating to the query; and
analyze the representation to compute a likelihood that each of the number of aggregates satisfies the query.

15. The system of paragraph 14, wherein the number of aggregates within the representation is partitioned according to a number of levels, and wherein each of the number of levels includes a number of aggregates of a specified resolution.

16. The system of paragraph 15, wherein the non-transitory machine readable medium includes code configured to direct the processor to analyze the representation based on a level specified by the query to compute a likelihood that each of the number of aggregates within the level satisfies the query.

17. The system of any one of paragraphs 15 or 16, wherein the non-transitory machine readable medium including code configured to direct the processor to:
analyze a lowest level of the representation to determine feature descriptors corresponding to each of a number of aggregates within the lowest level; and upscale the feature descriptors for the lowest level to identify feature descriptors corresponding to each of a number of aggregates within a next lowest level of the representation.

18. The system of paragraph 17, wherein each of the number of aggregates includes one cell.

19. The system of any one of paragraphs 14 or 15, wherein the non-transitory machine readable medium includes code configured to direct the processor to:
analyze the result of the query to determine modifications to the feature descriptors, the query, or the one or more vocabulary definitions, or any combinations thereof; and
implement the determined modifications.

20. The system of any one of paragraphs 14, 15, or 19, wherein the query includes a request for an identification of prospects within a subsurface represented by the seismic data set, and wherein the result of the query includes information relating to the identified prospects.

21. The system of paragraph 20, wherein the prospects include geological features or geophysical features, or both.

22. The system of any one of paragraphs 20 or 21, wherein the prospects include channels, salt bodies, faults, or geophysical abnormalities, or any combinations thereof.

23. The system of any one of paragraphs 20-22, wherein the prospects include regions of the subsurface including hydrocarbons.

24. The system of any of paragraphs 14, 15, 19, or 20, wherein the one or more vocabulary definitions include definitions of words within the query, definitions of rules relating to the query, or definitions of maps between the number of feature descriptors and corresponding probabilities, or any combinations thereof.

25. The system of any one of paragraphs 14, 15, 19, 20, or 24, wherein the query and the one or more vocabulary definitions are identified in response to input from a user of the system via a user interface.

26. The system of any one of paragraphs 14, 15, 19, 20, 24, or 25, wherein any of the one or more vocabulary definitions are identified within the storage medium.

27. The system of any one of paragraphs 14, 15, 19, 20, 24, 25 or 26, wherein the representation includes a recursive geometric representation, and wherein the number of aggregates within the recursive geometric representation is determined according to a recursive geometric decomposition of the seismic data set.

28. The system of any one of paragraphs 14, 15, 19, 20, 24, 25, 26 or 27, wherein each of the number of feature descriptors includes a mean, a residue, a variance, a gradient magnitude, a gradient direction, a histogram, a local texture, or a second moment, or any combinations thereof.

29. A method for identifying or characterizing prospects within a subsurface represented by a seismic data set, including:
identifying, via a computing device, a recursive geometric representation of a seismic data set including a number of aggregates;
determining a number of feature descriptors corresponding to each of the number of aggregates within the recursive geometric representation;
identifying a query relating to an identification or a characterization, or both, of the prospects within the subsurface;
identifying one or more vocabulary definitions relating to the query;
analyzing the recursive geometric representation based on the query to identify the prospects or characterize the prospects, or any combination thereof.

30. The method of paragraph 29, including:
determining modifications to the feature descriptors, the query, or the one or more vocabulary definitions, or any combinations thereof, that result in an improvement in the identification of the prospects or the characterization of the prospects, or both; and
implementing the determined modifications.

31. The method of any of paragraphs 29 or 30, wherein each of the number of aggregates includes one cell.

32. The method of paragraph 31, wherein the recursive geometric representation includes a number of two-dimensional layers of cells stacked in a hierarchical manner.

33. The method of paragraph 32, wherein the recursive geometric representation is recursive in at least one dimension.

34. The method of any one of paragraphs 29 to 31, wherein analyzing the recursive geometric representation to identify or characterize the prospects includes determining a likelihood that each of the number of aggregates within the recursive geometric representation corresponds to a region of the subsurface including one or more prospects.

35. The method of any one of paragraphs 29 to 31 or 34, wherein the prospects include regions of the subsurface including hydrocarbons.

36. The method of any one of paragraphs 29 to 31, 34, or 35, wherein the recursive geometric representation includes a recursive hexagonal representation.

37. The method of any one of paragraphs 29 to 31 or 34 to 36, including partitioning the number of aggregates within the recursive geometric representation according to a number of levels.

38. The method of any one of paragraphs 29 to 31 or 34 to 37, wherein determining the number of feature descriptors corresponding to each of the number of aggregates includes:
analyzing a lowest level of the representation to determine feature descriptors corresponding to each of a number of aggregates within the lowest level; and
upscaling the feature descriptors for the lowest level to identify feature descriptors corresponding to each of a number of aggregates within a next lowest level of the representation.

39. A non-transitory, computer-readable storage media for storing computer-readable instructions, the computer-readable instructions including code configured to direct a processor to:
generate a representation of a seismic data set;
determine a number of feature descriptors corresponding to each of a number of aggregates within the representation;
identify a query relating to the representation and one or more vocabulary definitions relating to the query;
analyze the representation to compute a likelihood that each of the number of aggregates satisfies the query; and
return a result of the query.

40. The non-transitory, computer-readable storage media of paragraph 39, wherein the computer-readable instructions include code configured to direct the processor to:
validate the result of the query;
if the result cannot be validated, determine modifications to the feature descriptors, the query, or the one or more vocabulary definitions, or any combinations thereof; and
implement the determined modifications.

41. The non-transitory, computer-readable storage media of paragraph 39 or 40, wherein the computer-readable instructions include code configured to direct the processor to partition the number of aggregates within the representation according to a number of levels, wherein each of the number of levels includes aggregates of a specified resolution.

42. The non-transitory, computer-readable storage media of paragraph 41, wherein the computer-readable instructions include code configured to direct the processor to:
analyze a lowest level of the representation to determine feature descriptors corresponding to each of a number of aggregates within the lowest level; and
upscale the feature descriptors for the lowest level to identify feature descriptors corresponding to each of a number of aggregates within a next lowest level of the representation.

While the present techniques may be susceptible to various modifications and alternative forms, the embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

What is claimed is:

1. A method for analyzing seismic data, comprising:
identifying, via a computing device, a representation of a seismic data set, said representation comprising a plurality of aggregates;
partitioning the plurality of aggregates within the representation according to a plurality of levels, wherein each level of the plurality of levels comprises one or more aggregates of the same specified resolution for that level;
for the one or more aggregates of each level, determining a feature descriptor corresponding to each such aggregate within each such level;
formulating a query relating to the representation and one or more vocabulary definitions relating to the query to the feature descriptors;
computing a likelihood that each of the plurality of aggregates satisfies the query with a probabilistic relationship between the vocabulary and feature descriptors;
returning a result of the query;
based at least in part on the returned result, identifying one or more prospects in a subsurface area represented by the seismic data; and
causing a well to be drilled in the subsurface area based on the one or more identified prospects.

2. The method of claim 1, wherein each aggregate comprises one or more cells, and each cell comprises one or more voxels representing specific seismic data.

3. The method of claim 1, wherein determining a feature descriptor corresponding to each aggregate within each level comprises:
analyzing a lowest level of the representation to determine feature descriptors corresponding to each of the one or more aggregates within the lowest level; and
upscaling the feature descriptors for the lowest level to identify feature descriptors corresponding to each of the one or more aggregates within a next lowest level of the representation.

4. The method of claim 3, wherein each of the one or more aggregates within the lowest level of the representation comprises one cell.

5. The method of claim 1, wherein computing the likelihood that each of the plurality of aggregates satisfies the query comprises:
comparing feature descriptors for a first aggregate to feature descriptors for a plurality of surrounding aggregates; and
determining a likelihood that the first aggregate satisfies the query based on the comparison.

6. The method of claim 1, comprising:
validating the result of the query;
if the result cannot be validated, determining modifications to the feature descriptors, definitions of likelihood that each of the plurality of aggregates satisfies the query, the query, or the one or more vocabulary definitions, or any combinations thereof; and
implementing the determined modifications.

7. The method of claim 1, comprising identifying the query and the one or more vocabulary definitions in response to input from a user of the computing device.

8. The method of claim 1, wherein the prospects comprise geological features or geophysical features, or both.

9. The method of claim 1, wherein determining a feature descriptor corresponding to each said aggregate comprises determining at least one of a mean value, a variance, a texture, or a gradient, or any combinations thereof, for the seismic data represented by the aggregate.

10. The method of claim 1, wherein the one or more vocabulary definitions comprises definitions of words within the query, definitions of rules relating to the query, or definitions of maps between the plurality of feature descriptors and corresponding probabilities, or any combinations thereof.

11. The method of claim 1, wherein the feature descriptors comprise numerical values, and wherein the method includes determining geological features or geophysical features, or both, of a subsurface represented by the seismic data based on the numerical values.

12. The method of claim 1, wherein the feature descriptor relates to one of said prospects of the subsurface represented by the seismic data; and wherein the method further comprises
computing the likelihood that each of the plurality of aggregates corresponds to a region of the subsurface comprising the desired prospect.

13. The method of claim 1, wherein the one or more prospects comprise channels, salt bodies, faults, or geophysical abnormalities, or any combinations thereof.

14. The method of claim 1, wherein the one or more prospects comprise regions of the subsurface comprising hydrocarbons.

15. The method of claim 1, wherein the representation comprises a recursive geometric representation, and wherein the plurality of aggregates within the recursive geometric representation is determined according to a recursive geometric decomposition of the seismic data set.

16. The method of claim 1, wherein each of the plurality of feature descriptors comprises a mean, a residue, a variance, a gradient magnitude, a gradient direction, a histogram, a local texture, or a second moment, or any combinations thereof.

17. A method for identifying or characterizing prospects within a subsurface represented by a seismic data set, comprising:
identifying, via a computing device, a recursive geometric representation of a seismic data set, said recursive geometric representation comprising a plurality of aggregates;

partitioning the plurality of aggregates within the recursive geometric representation according to a plurality of levels, wherein each level of the plurality of levels comprises one or more aggregates, each aggregate of the same specified resolution for that level;

for the one or more aggregates of each level, determining a feature descriptor corresponding to each such aggregate within each such level;

formulating a query relating to an identification or a characterization, or both, of the prospects within the subsurface;

identifying one or more vocabulary definitions relating the query to the feature descriptors;

identifying the prospects and/or characterizing the prospects based at least in part upon analysis of the recursive geometric representation and the query; and causing a well to be drilled based on the one or more identified and/or characterized prospects.

18. The method of claim 17, comprising:

determining modifications to the feature descriptors, the query, or the one or more vocabulary definitions, or any combinations thereof, that result in an improvement in the identification of the prospects or the characterization of the prospects, or both; and implementing the determined modifications.

19. The method of claim 17, wherein each of the plurality of aggregates comprises one cell.

20. The method of claim 19, wherein the recursive geometric representation comprises a plurality of two-dimensional layers of cells stacked in a hierarchical manner.

21. The method of claim 20, wherein the recursive geometric representation is recursive in at least one dimension.

22. The method of claim 17, wherein analyzing the recursive geometric representation to identify or characterize the prospects comprises determining a likelihood that each of the plurality of aggregates within the recursive geometric representation corresponds to a region of the subsurface comprising one or more prospects.

23. The method of claim 17, wherein the prospects comprise regions of the subsurface comprising hydrocarbons.

24. The method of claim 17, wherein the recursive geometric representation comprises a recursive hexagonal representation.

25. The method of claim 17, wherein determining a feature descriptor corresponding to each aggregate within each level comprises:

analyzing a lowest level of the recursive geometric representation to determine feature descriptors corresponding to each of the one or more aggregates within the lowest level; and upscaling the feature descriptors for the lowest level to identify feature descriptors corresponding to each of the one or more aggregates within a next lowest level of the representation.

* * * * *